(12) United States Patent
Ovadia et al.

(10) Patent No.: US 7,315,693 B2
(45) Date of Patent: Jan. 1, 2008

(54) DYNAMIC ROUTE DISCOVERY FOR OPTICAL SWITCHED NETWORKS

(75) Inventors: Shlomo Ovadia, San Jose, CA (US); Christian Maciocco, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 10/691,712

(22) Filed: Oct. 22, 2003

(65) Prior Publication Data

US 2005/0089327 A1    Apr. 28, 2005

(51) Int. Cl.
    *H04J 14/00*    (2006.01)
(52) U.S. Cl. .............................. 398/57; 398/47; 398/49
(58) Field of Classification Search .................. 398/45, 398/49, 57, 47, 51, 50, 52, 54, 55, 56
    See application file for complete search history.

(56) References Cited

U.S. PATENT DOCUMENTS

| | | | |
|---|---|---|---|
| 4,663,748 A | 5/1987 | Karbowiak et al. |
| 5,235,592 A | 8/1993 | Cheng et al. |
| 5,331,642 A | 7/1994 | Valley et al. |
| 5,457,556 A | 10/1995 | Shiragaki |
| 5,506,712 A | 4/1996 | Sasayama et al. |
| 5,550,803 A | 8/1996 | Crayford et al. |
| 5,559,796 A | 9/1996 | Edem et al. |
| 5,646,943 A | 7/1997 | Elwalid |
| 5,768,274 A | 6/1998 | Murakami et al. |
| 5,838,663 A | 11/1998 | Elwalid et al. |
| 5,970,050 A | 10/1999 | Johnson |
| 5,978,356 A | 11/1999 | Elwalid et al. |
| 6,111,673 A | 8/2000 | Chang et al. |
| 6,222,839 B1 | 4/2001 | Nakazaki et al. |
| 6,260,155 B1 | 7/2001 | Dellacona |
| 6,271,946 B1 | 8/2001 | Chang et al. |
| 6,272,117 B1 | 8/2001 | Choi et al. |

(Continued)

FOREIGN PATENT DOCUMENTS

CN    1384618    12/2002

(Continued)

OTHER PUBLICATIONS

O'Mahony, Mike J. et al., "The Application of Optical Packet Switching in Future Communication Networks", IEEE Communications Magazine, Mar. 2001, pp. 128-135.

(Continued)

*Primary Examiner*—M. R. Sedighian
(74) *Attorney, Agent, or Firm*—Blakely, Sokoloff, Taylor & Zafman LLP

(57) ABSTRACT

An architecture and method for performing dynamic route discovery and variable time slot reservation provisioning within optical-switched networks. The method employs extensions to the RSVP-TE signaling protocol, which uses various messages to reserve network resources. Under an overlay routing embodiment, network resources are reserved via a resource reservation message that is sent hop-by-hop between switching nodes, wherein the next hops are dynamically selected based on routing tree tables in the switching nodes. The concatenation of hops forms the route for the reserved lightpath. The resource reservation request is passed between nodes defined by a dynamically routed path, and resource availability is confirmed for the entire lightpath prior to confirming the resource reservations.

29 Claims, 19 Drawing Sheets

U.S. PATENT DOCUMENTS

| | | |
|---|---|---|
| 6,325,636 B1 | 12/2001 | Hipp et al. |
| 6,339,488 B1 | 1/2002 | Beshai et al. |
| 6,400,863 B1 | 6/2002 | Weinstock et al. |
| 6,411,506 B1 | 6/2002 | Hipp et al. |
| 6,466,586 B1 | 10/2002 | Darveau et al. |
| 6,487,686 B1 | 11/2002 | Yamazaki et al. |
| 6,490,292 B1 | 12/2002 | Matsuzawa |
| 6,498,667 B1 | 12/2002 | Masucci et al. |
| 6,519,062 B1 | 2/2003 | Yoo |
| 6,519,255 B1 | 2/2003 | Graves |
| 6,525,850 B1 | 2/2003 | Chang et al. |
| 6,542,499 B1 | 4/2003 | Murphy et al. |
| 6,545,781 B1 | 4/2003 | Chang et al. |
| 6,603,893 B1 | 8/2003 | Liu et al. |
| 6,615,382 B1 | 9/2003 | Kang et al. |
| 6,665,495 B1 | 12/2003 | Miles et al. |
| 6,671,256 B1 | 12/2003 | Xiong et al. |
| 6,674,558 B1 | 1/2004 | Chang et al. |
| 6,690,036 B2 | 2/2004 | Liu et al. |
| 6,697,374 B1 | 2/2004 | Shraga et al. |
| 6,721,271 B1 | 4/2004 | Beshai et al. |
| 6,721,315 B1 | 4/2004 | Xiong et al. |
| 6,839,322 B1 | 1/2005 | Smith |
| 6,842,424 B1 | 1/2005 | Key et al. |
| 6,873,797 B2 | 3/2005 | Chang et al. |
| 6,898,205 B1 | 5/2005 | Chaskar et al. |
| 6,940,863 B2 | 9/2005 | Xue et al. |
| 6,956,868 B2 | 10/2005 | Qiao |
| 6,987,770 B1 | 1/2006 | Yonge, III |
| 6,990,071 B2 | 1/2006 | Adam et al. |
| 7,023,846 B1 | 4/2006 | Andersson et al. |
| 7,035,537 B2 | 4/2006 | Wang et al. |
| 7,092,633 B2 | 8/2006 | Fumagalli et al. |
| 7,106,968 B2 | 9/2006 | Lahav et al. |
| 2002/0018263 A1 | 2/2002 | Ge et al. |
| 2002/0018468 A1 | 2/2002 | Nishihara |
| 2002/0023249 A1 | 2/2002 | Temullo et al. |
| 2002/0024700 A1 | 2/2002 | Yokoyama et al. |
| 2002/0027686 A1 | 3/2002 | Wada et al. |
| 2002/0063924 A1 | 5/2002 | Kimbrough et al. |
| 2002/0109878 A1 | 8/2002 | Qiao |
| 2002/0118419 A1 | 8/2002 | Zheng et al. |
| 2002/0126337 A1 | 9/2002 | Uematsu et al. |
| 2002/0141400 A1 | 10/2002 | DeMartino |
| 2002/0150099 A1 | 10/2002 | Pung et al. |
| 2002/0154360 A1 | 10/2002 | Liu |
| 2002/0159114 A1 | 10/2002 | Sehasrabuddhe et al. |
| 2002/0186433 A1* | 12/2002 | Mishra ................ 359/128 |
| 2002/0186695 A1 | 12/2002 | Schwartz et al. |
| 2002/0196808 A1 | 12/2002 | Karri et al. |
| 2003/0002499 A1 | 1/2003 | Cummings et al. |
| 2003/0009582 A1 | 1/2003 | Qiao et al. |
| 2003/0016411 A1 | 1/2003 | Zhou et al. |
| 2003/0031198 A1 | 2/2003 | Currivan et al. |
| 2003/0037297 A1 | 2/2003 | Araki |
| 2003/0039007 A1 | 2/2003 | Ramadas et al. |
| 2003/0043430 A1 | 3/2003 | Handelman |
| 2003/0048506 A1 | 3/2003 | Handelman |
| 2003/0053475 A1 | 3/2003 | Veeraraghavan et al. |
| 2003/0067880 A1 | 4/2003 | Chiruvolu |
| 2003/0099243 A1 | 5/2003 | Oh et al. |
| 2003/0120799 A1 | 6/2003 | Lahav et al. |
| 2003/0189933 A1 | 10/2003 | Ozugur et al. |
| 2003/0198471 A1 | 10/2003 | Ovadia |
| 2003/0214979 A1 | 11/2003 | Kang et al. |
| 2004/0004966 A1 | 1/2004 | Foster et al. |
| 2004/0052525 A1 | 3/2004 | Ovadia |
| 2004/0062263 A1 | 4/2004 | Charcranoon et al. |
| 2004/0120261 A1 | 6/2004 | Ovadia |
| 2004/0131061 A1 | 7/2004 | Matsuoka et al. |
| 2004/0156325 A1 | 8/2004 | Perkins et al. |
| 2004/0156390 A1 | 8/2004 | Prasad et al. |
| 2004/0170165 A1 | 9/2004 | Maciocco et al. |
| 2004/0170431 A1 | 9/2004 | Maciocco et al. |
| 2004/0208171 A1 | 10/2004 | Ovadia et al. |
| 2004/0208172 A1 | 10/2004 | Ovadia et al. |
| 2004/0208544 A1 | 10/2004 | Ovadia |
| 2004/0234263 A1 | 11/2004 | Ovadia et al. |
| 2004/0252995 A1 | 12/2004 | Ovadia et al. |
| 2004/0258407 A1 | 12/2004 | Maciocco et al. |
| 2004/0264960 A1 | 12/2004 | Maciocco et al. |
| 2005/0030951 A1 | 2/2005 | Maciocco et al. |
| 2005/0063701 A1 | 3/2005 | Ovadia et al. |
| 2005/0068968 A1 | 3/2005 | Ovadia et al. |
| 2005/0068995 A1 | 3/2005 | Lahav et al. |
| 2005/0089327 A1 | 4/2005 | Ovadia et al. |
| 2005/0105905 A1 | 5/2005 | Ovadia et al. |
| 2005/0152349 A1 | 7/2005 | Takeuchi et al. |
| 2005/0175183 A1 | 8/2005 | Ovadia et al. |
| 2005/0175341 A1 | 8/2005 | Ovadia |
| 2005/0177749 A1 | 8/2005 | Ovadia |
| 2005/0259571 A1 | 11/2005 | Battou |
| 2006/0008273 A1 | 1/2006 | Xue et al. |

FOREIGN PATENT DOCUMENTS

| | | |
|---|---|---|
| CN | 1406000 | 3/2003 |
| CN | 1426189 | 6/2003 |
| EP | 0876076 | 11/1998 |
| EP | 1 073 306 A | 1/2001 |
| EP | 1073307 | 1/2001 |
| EP | 1089498 | 4/2001 |
| EP | 1122971 | 8/2001 |
| EP | 1135000 | 9/2001 |
| EP | 1217862 | 6/2002 |
| EP | 1303111 | 4/2003 |
| EP | 1 351 458 A1 | 10/2003 |
| WO | WO 01/19006 | 3/2001 |
| WO | WO 01/67694 | 9/2001 |
| WO | WO 01/76160 | 10/2001 |
| WO | WO 01/86998 A | 11/2001 |
| WO | WO 02/41663 | 5/2002 |
| WO | WO 02/067505 | 8/2002 |
| WO | PCT/US2004/034973 | 2/2005 |

OTHER PUBLICATIONS

Yao, Shun et al., "All-Optical Switching for Metropolitan Area Networks: Opportunities and Challenges", IEEE Communications Magazine, Mar. 2001, pp. 142-148.

Qiao, Chunming DR. et al., "Optical Burst Switching", Business Briefing: Global Photonics Applications and Technology, pp. 108-112.

Qiao, Chunming "Labeled Optical Burst Switching for IP-over-WDM Integration", IEEE Communications Magazine, Sep. 2000, pp. 104-114.

Carena, A. et al., "OPERA: An Optical Packet Experimental Routing Architecture with Label Swapping Capability", Journal of Lightwave Technology, vol. 16, No. 12, Dec. 1998, pp. 2135-2145.

Zhong, Wen DE, "A New Wavelength-Routed Photonic Packet Buffer Combining Traveling Delay Lines with Delay-Line Loops", Journal of Lightwave Technology, vol. 19, No. 8, Aug. 2001, pp. 1085-1092.

Wiesmann, D. et al., "Apodized Surface-Corrugated Gratings with Varying Duty Cycles", IEEE Photonics Technology Letters, vol. 12, No. 6, Jun. 2000, pp. 639-640.

Hill, Kenneth O. et al., "Fiber Bragg Grating Technology Fundamentals and Overview", Journal of Lightwave Technology, vol. 15, No. 8, Aug. 1997, pp. 1263-1276.

Erdogan, Turan, "Fiber Grating Spectra", Journal of Ligthwave Technology, vol. 15, No. 8, Aug. 1997, pp. 1277-1294.

Sugden, K. et al., "Fabrication and Characterization of Bandpass Filters Based on Concatenated Chirped Faber Gratings", Journal of Lightwave Technology, vol. 15, No. 8, Aug. 1997, pp. 1424-1432.

Giles, C.R., "Lightwave Applications of Fiber Bragg Gratings", Journal of Lightwave Technology, vol. 15, No. 8, Aug. 1997, pp. 1391-1404.

Willner, A. E. et al., "Tunable Compensation of Channel Degrading Effects Using Nonlinearly Chirped Passive Fiber Bragg Gratings", IEEE Journal of Selected Topics in Quantum Electronics, vol. 5, No. 5 Sep./Oct. 1999, pp. 1298-1311.

Studenkov, P.V. et al., "Asymmetric Twin-Waveguide 1.55 μm Wavelength Laser with a Distributed Bragg Reflector", IEEE Photonics Technology Letters, vol. 12., No. 5, May 2000, pp. 468-470.

Shibata, Yasuo et al., "Coupling Coefficient Modulation of Waveguide Grating Using Sampled Grating", IEEE Photonics Technology Letters, vol. 6, No. 10, Oct. 1994, pp. 1222-1224.

Chaskar, H. et al., "Robust Transport of IP Traffic Over WDM Using Optical Burst Switching," Optical Networks Magazine, Jul./Aug. 2002, pp. 47-60.

Oh, Se-Yoon et al., "A Data Burst Assembly Algorithm in Optical Burst Switching Networks," ETRI Journal, vol. 24, No. 4, Aug. 2002, pp. 311-322, Electronics and Telecommunications Research Institute, Tejon, Korea.

IETF Networking Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, vol. 4872, Jul. 29, 2002, pp. 220-229, SPIE, Bellingham, VA, US.

Greg Bernstein et al., "OIF UNI 1.0—Controlling Optical Networks", info@oiforum.com, pp. 1-3.

(ABSTRACT), "MPLS Technologies for IP Networking Solution", pp. 1-5.

Gallaher, Rick, "An Introduction to MPLS", Course Director for Global Knowledge and President of Telecommunications Technical Services, Inc., Sep. 10, 2001, pp. 1-7.

"Compare SANs to Alternate Technologies", Brocade, Retrieved on Feb. 26, 2003 from http://www.brocade.com/san/evaluate/compare_san.jsp.

Khattar, Ravi Kumar et al., "Introduction to Storage Area Network, SAN", International Technical Support Organization, Aug. 1999, www.redbooks.ibm.com.

Sahara, A. et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European Transactions on Telecommunications, vol. 11, No. 1, Jan.-Feb. 2000, pp. 17-26.

Baldine, I. et al., "Jumpstart: A Just-In-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

"Generalized Multiprotocol Label Switching (GMPLS)", Copyright © The International Engineering Consortium, Web ProForum Tutorials http://www.iec.org, pp. 1-27.

Floyd, Sally et al., "Modifying TCP's Congestion Control For High Speeds", May 5, 2002, pp. 1-5.

Fredj, Ben S. et al., "Statistical Bandwidth Sharing: A Study of Congestion at Flow Level", France Telecom R&D, pp. 111-122.

Zeljkovic, Nada et al., "A Simulation Analysis of Statistical Multiplexing in Frame Relay and ATM Internworking", TELESIKS 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technologies, IEEE INFOCOM 2001, pp. 527-536.

Su, C.-F. et al., "On Statistical Multiplexing, Traffic Mixes, and VP Management", University of Texas at Austin, 1998 IEEE.

Brown, Timothy X., "Adaptive Statistical Multiplexing for Broadband Communication", Performance Evaluation and Application of ATM Networks, Kouvatsos, D. editor, Kluwer, 2000, pp. 51-80.

Walch, Philip F., "FEC Standards and Long Haul STM-64 DWDM Transmission," Contribution to T1 Standards Project T1X1.5, Jan. 17-20, 2000, pp. 1-4.

"ITU-T Rec. G.709/Y.133—Interfaces for the Optical Transport Network (OTN)," International Telecommunication Union, Mar. 2003, pp. 1-109.

Henderson, Michael P., "Forward Error Correction in Optical Network," Mar. 27, 2001. http://members.cox.net/michaeo.henderson/Papers/Optical_FEC.pdf, pp. 1-18.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-MPLS with NIST GMPLS Lightwave Agile Switching Simulator (GLASS)," Joint Conference of Communication and Information -2002, Jeju, Korea, 4 pgs.

Cao, Xiaojun et al., "Assembling TCP/IP Packets in Optical Burst Switched Networks", IEEE Global Telecommunication Conference, 2002, pp. 2808-2812, vol. 1, New York.

Wang, S.Y., "Using TCP Congestion Control to Improve the Performance of Optical Burst Switched Networks", IEEE International Conference on Communications, 2003, pp. 1438-1442, Taiwan.

Detti, Andrea et al., "Impact of Segments Aggregation on TCP Reno Flows in Optical Burst Switching Networks", IEEE Infocom, 2002, pp. 1803-1805, vol. 1, New York.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al., "A Border Gateway Protocol 4 (BGP-4)", Network Working Group, Mar. 1995, pp. 1-57.

Final Office Action mailed on Oct. 26, 2006. Maciocco et al., "Method and System to Frame and Format Optical Control and Data Bursts in WDM-Based Photonic Burst Switched Networks", U.S. Appl. No. 10/377,580, filed Feb. 28, 2003.

Office Action mailed on Oct. 18, 2006. Ovadia et al., "Architecture and Method for Framing Control and Data Bursts Over 10 GBIT Ethernet with and Without Wan Interface Sublayer Support", U.S. Appl. No. 10/459,781, filed Jun. 11, 2003.

Office Action mailed on Nov. 15, 2006. Ovadia et al., "Architecture and Method for Framing Optical Control and Data Bursts Within Optical Trasport Unit Structures in Photonic Burst-Switched Networks", U.S. Appl. No. 10/441,771, filed May 19, 2003.

Final Office Action mailed on Nov. 22, 2006. Maciocco et al., "Adaptive Framework for Closed-Loop Protocols Over Photonic Burst Switched Networks", U.S. Appl. No. 10/464,969, filed Jun. 18, 2003.

Office Action mailed on Nov. 29, 2006. Ovadia et al., "Architecture, Method and System of Multiple High-Speed Servers to Network in WDM Based Photonic Burst-Switched Networks," U.S. Appl. No. 10/417,823, filed Apr. 16, 2003.

Office Action mailed on Dec. 29, 2006. U.S. Appl. No. 10/418,487, filed Apr. 17, 2003, Ovadia et al.

Office Action mailed on Jan. 3, 2007. U.S. Appl. No. 10/668,874, filed Sep. 23, 2003, Ovadia et al.

Office Action mailed on Jan. 10, 2007. U.S. Appl. No. 10/636,062, filed Aug. 6, 2003, Maciocco et al.

Final Office Action mailed on Jan. 17, 2007. U.S. Appl. No. 10/606,323, filed Jun. 24, 2003, Maciocco et al.

Final Office Action mailed on Feb. 9, 2007. U.S. Appl. No. 10/373,312, filed Feb. 28, 2003, Maciocco et al.

Non-Final Office Action mailed on Feb. 20, 2007. U.S. Appl. No. 10/377,580, filed Feb. 28, 2003, Maciocco et al.

Jacob et al., "Delay Performance of Some Scheduling Strategies In an Input Queuing ATM with Multiclass Bursty Traffic," IEEE/ACM Transactions on Networking, vol. 4, No. 2, Apr. 1996, pp. 258-271.

Yoo et al., "Optical Burst Switching for Service differentiation in the Next-Generation Optical Internet," IEEE, Feb. 2001, pp. 98-104.

Guillemot et al., "Transparent Optical Packet Switching: The European Acts Keops Project Approach," IEEE 1998, Journal of Lightwave Technology, vol. 16, No. 12, Dec. 1998, pp. 2117-2126.

Gambini et al., "Transparent Optical Packet Switching: Network Architecture and Demonstrators in the KEOPS Project," IEEE Journal of Selected Areas In Communications, vol. 16, No. 7, Sep. 1998, pp. 1245-1259.

Mehorta, Pronita, et al., "Network Processor Design for Optical Burst Switched Networks," Proceedings of the 14th Annual IEEE International ASIC/SOC Conference, Sep. 12-15, 2001, pp. 296-300.

Ovadia, Shlomo et al., "Photonic Burst Switching (PBS) Architecture for Hop and Span-Constrained Optical Networks," IEEE Optical Communications, vol. 41, No. 11, Nov. 2003, pp. 524-532.

Office Action mailed on Jan. 12, 2007, U.S. Appl. No. 10/242,839, filed Sep. 13, 2002, Ovadia et al.

Office Action mailed on Mar. 31, 2007, U.S. Appl. No. 10/713,585, filed Nov. 13, 2002, Ovadia et al.

Final Office Action mailed on Jan. 17, 2007, U.S. Appl. No. 10/606,323, filed Jun. 24, 2003, Maciocco et al.

Final Office Action mailed on Feb. 29, 2007, U.S. Appl. No. 10/373,312, filed Feb. 28, 2003, Maciocco et al.

Non-Final Office Action mailed on Feb. 20, 2007, U.S. Appl. No. 10/377,580, filed Feb. 28, 2003, Maciocco et al.

* cited by examiner

```
<Path Message> ::=
        <Common Header> ~802
        [ <INTEGRITY> ] ~804
        <UNI_IPv4_SESSION> ~806
        <IPv4_IF_ID_RSVP_HOP> ~808
        <TIME_VALUES> ~810
        [ <EXPLICIT_ROUTE> ] ~811
        <GENERALIZED_PBS_LABEL_REQUEST> ~812
        [ <LABEL_SET> ... ] ~814
        [ < ADMIN_STATUS> ] ~816
        <DESTINATION_PBS_ADDRESS> ~818
        <SOURCE_PBS_ADDRESS > ~820
        [ <POLICY_DATA> ... ] ~822
        <sender descriptor> ~824
```

*Fig. 8a*   800

Sender descriptor for a unidirectional PBS light-path:

```
<sender descriptor> ::=
        <LSP_TUNNEL_IPv4_SENDER_TEMPLATE> ~826
        <PBS_SENDER_TSPEC> ~828
```

*Fig. 8b*   824A

Format of the sender descriptor for a bi-directional PBS light-path

```
<sender descriptor> ::=
        <LSP_TUNNEL_IPv4_SENDER_TEMPLATE> ~826
        <PBS_SENDER_TSPEC> ~828
        <UPSTREAM_LABEL> ~830
```

*Fig. 8c*   824B

```
<Resv Message> ::=
        <Common Header> ~802
        [ <INTEGRITY> ] ~804
        <UNI_IPv4_SESSION> ~806
        < IPv4_IF_ID_RSVP_HOP > ~808
        <TIME_VALUES> ~810
        [ <IPv4_RESV_CONFIRM> ] ~1004
        [ <ADMIN_STATUS>] ~816
        [ <POLICY_DATA> ... ] ~822
        <STYLE> ~1006
        <FF flow descriptor> ~1008
```

```
<FF flow descriptor> ::=
    <PBS_FLOWSPEC> ~1010
    <LSP_TUNNEL_IPv4_FILTER_SPEC> ~1012
    <GENERALIZED_PBS_LABEL> ~1014
```

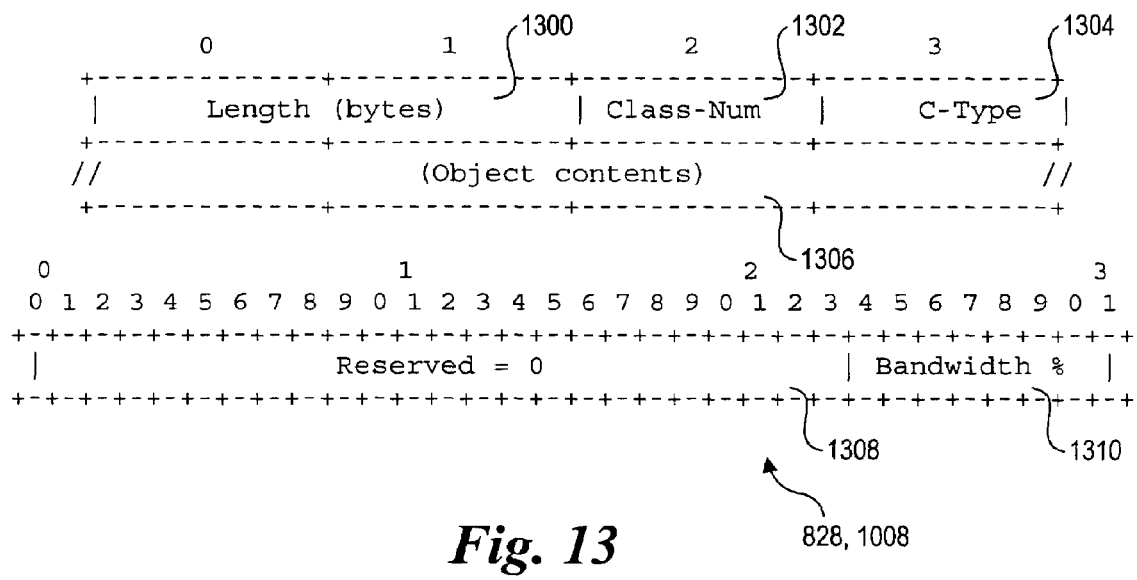

RESERVATION TABLE 1700

| Key (Burst ID) | Input Fiber Port | Input Wavelength | Input Lightpath Segment ID | Output Fiber Port | Output Wavelength | Output Lightpath Segment ID | Start Time | End Time | Bandwidth % | Status |
|---|---|---|---|---|---|---|---|---|---|---|
| ...1005 | 1 | 195.6 | LP1 | 5 | 195.6 | LP3 | 12:00:000 | 12:00:001 | 30 | 1 |
| ...1027 | 1 | 197.2 | LP1 | 5 | 197.2 | LP4 | 12:00:000 | 12:00:003 | 30 | 1 |
| ...1045 | 2 | 197.2 | LP2 | 6 | 197.2 | LP4 | 12:00:001 | 12:00:002 | 35 | 1 |
| ...1115 | 3 | 196.4 | LP3 | 4 | 196.4 | LP2 | 12:00:002 | 12:00:003 | 15 | 1 |
| ...1146 | 1 | 195.6 | LP1 | 5 | 195.6 | LP13 | 12:00:002 | 12:00:004 | 40 | 1 |
| ...1178 | 2 | 196.4 | LP2 | 6 | 196.4 | LP3 | 12:00:002 | 12:00:003 | 10 | 1 |
| ...1222 | 6 | 197.2 | LP4 | 1 | 197.2 | LP1 | 12:00:004 | 12:00:006 | 25 | 1 |
| ...1256 | 4 | 195.6 | LP3 | 3 | 195.6 | LP3 | 12:00:004 | 12:00:007 | 25 | 0 |
| ...1313 | 2 | 196.4 | LP2 | 2 | 196.4 | LP2 | 12:00:005 | 12:00:006 | 20 | 0 |
| ...1345 | 5 | 195.6 | LP13 | 1 | 195.6 | LP1 | 12:00:005 | 12:00:007 | 30 | 0 |

*Fig. 17*

DYNAMIC ROUTE DISCOVERY FOR OPTICAL SWITCHED NETWORKS

CROSS REFERENCE TO RELATED APPLICATIONS

The present application is related to U.S. patent application Ser. No. 10/126,091, filed Apr. 17, 2002; U.S. patent application Ser. No. 10/183,111, filed Jun. 25, 2002; U.S. patent application Ser. No. 10/328,571, filed Dec. 24, 2002; U.S. patent application Ser. No. 10/377,312 filed Feb. 28, 2003; U.S. patent application Ser. No. 10/377,580 filed Feb. 28, 2003; U.S. patent application Ser. No. 10/417,823 filed Apr. 16, 2003; U.S. patent application Ser. No. 10/417,487 filed Apr. 17, 2003; U.S. patent application Ser. No. 10/441,771 filed May 19, 2003, U.S. patent application Ser. No. 10/464,969 filed Jun. 18, 2003, U.S. patent application Ser. No. 10/606,323 filed Jun. 24, 2003, and U.S. patent application Ser. No. 10/636,062 filed Aug. 6, 2003.

FIELD OF THE INVENTION

Embodiments of the present invention relate to optical networks in general; and, more specifically, to techniques for dynamic route discovery for optical-switched network.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology enables the same physical link to transport multiple pieces of data concurrently.

Conventional optical switched networks typically use wavelength routing techniques, which require that optical-electrical-optical (O-E-O) conversion of optical signals be done at the optical switches. O-E-O conversion at each switching node in the optical network is not only a very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. Furthermore, as LAN speeds/bandwidth increase with improved technology, there is a corresponding need for increasing MAN/WAN speeds/bandwidth.

Recently, optical burst switching (OBS) schemes have emerged as a promising solution to support high-speed bursty data traffic over WDM optical networks. The OBS scheme offers a practical opportunity between the current optical circuit-switching and the emerging all optical packet switching technologies. It has been shown that under certain conditions, the OBS scheme achieves high-bandwidth utilization and class-of-service (CoS) by elimination of electronic bottlenecks as a result of the O-E-O conversion occurring at switching nodes, and by using a one-way end-to-end bandwidth reservation scheme with variable time slot duration provisioning scheduled by the ingress nodes. Optical switching fabrics are attractive because they offer at least one or more orders of magnitude lower power consumption with a smaller form factor than comparable O-E-O switches. However, most of the recently published work on OBS networks focuses on the next-generation backbone data networks (i.e. Internet wide network) using high capacity (i.e., 1 Tb/s) WDM switch fabrics with a large number of input/output ports (i.e., 256×256), optical channels (i.e., 40 wavelengths), and requiring extensive buffering. Thus, these WDM switches tend to be complex and very expensive to manufacture. In contrast, there is a growing demand to support a wide variety of bandwidth-demanding applications such as storage area networks (SANs) and multimedia multicast at a low cost for both local and wide-area networks.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 8a, 8b, and 8c are data structures corresponding to an RSVP-TE-based Path message including extensions to support a coarse-grain resource reservation mechanism in accordance with one embodiment of the invention.

FIG. 9 is a data structure corresponding to a generalized PBS label request object of the Path message data structure of FIG. 8a.

FIGS. 10a, and 10b are data structures corresponding to an RSVP-TE-based Resv message including extensions to support the coarse-grain resource reservation mechanism in accordance with one embodiment of the invention.

FIG. 11 is a data structure corresponding to an RSVP-TE-based PathTear message including extensions to support tear down of resource reservations in accordance with one embodiment of the invention.

FIG. 12 is a data structure corresponding to an RSVP-TE-based ResvTear message including extensions to support tear down of resource reservations in accordance with one embodiment of the invention.

FIG. 13 is diagram illustrating a data structure corresponding to a sender descriptor object and a flow descriptor object that includes a field containing a bandwidth % value used to request reservation of resources supporting a % of the bandwidth provided by such resources.

FIG. 16 is a schematic diagram illustrating components of a Path message employed in an example lightpath reservation process corresponding to FIG. 14a.

FIG. 17 is a diagram illustrating an exemplary resource reservation table hosted by node B of FIG. 6 and containing data used in connection explaining the lightpath reservation process of FIGS. 14a and 14b.

DETAILED DESCRIPTION OF PREFERRED EMBODIMENTS

In the following detailed descriptions, embodiments of the invention are disclosed with reference to their use in a photonic burst-switched (PBS) network. A PBS network is a type of optical switched network, typically comprising a high-speed hop and span-constrained network, such as an enterprise network. The term "photonic burst" is used herein to refer to statistically-multiplexed packets (e.g., Internet protocol (IP) packets or Ethernet frames) having similar routing requirements. Although conceptually similar to backbone-based OBS networks, the design, operation, and performance requirements of these high-speed hop and span-constrained networks may be different. However, it will be understood that the teaching and principles disclosed herein may be applicable to other types of optical switched networks as well.

Figure 1:
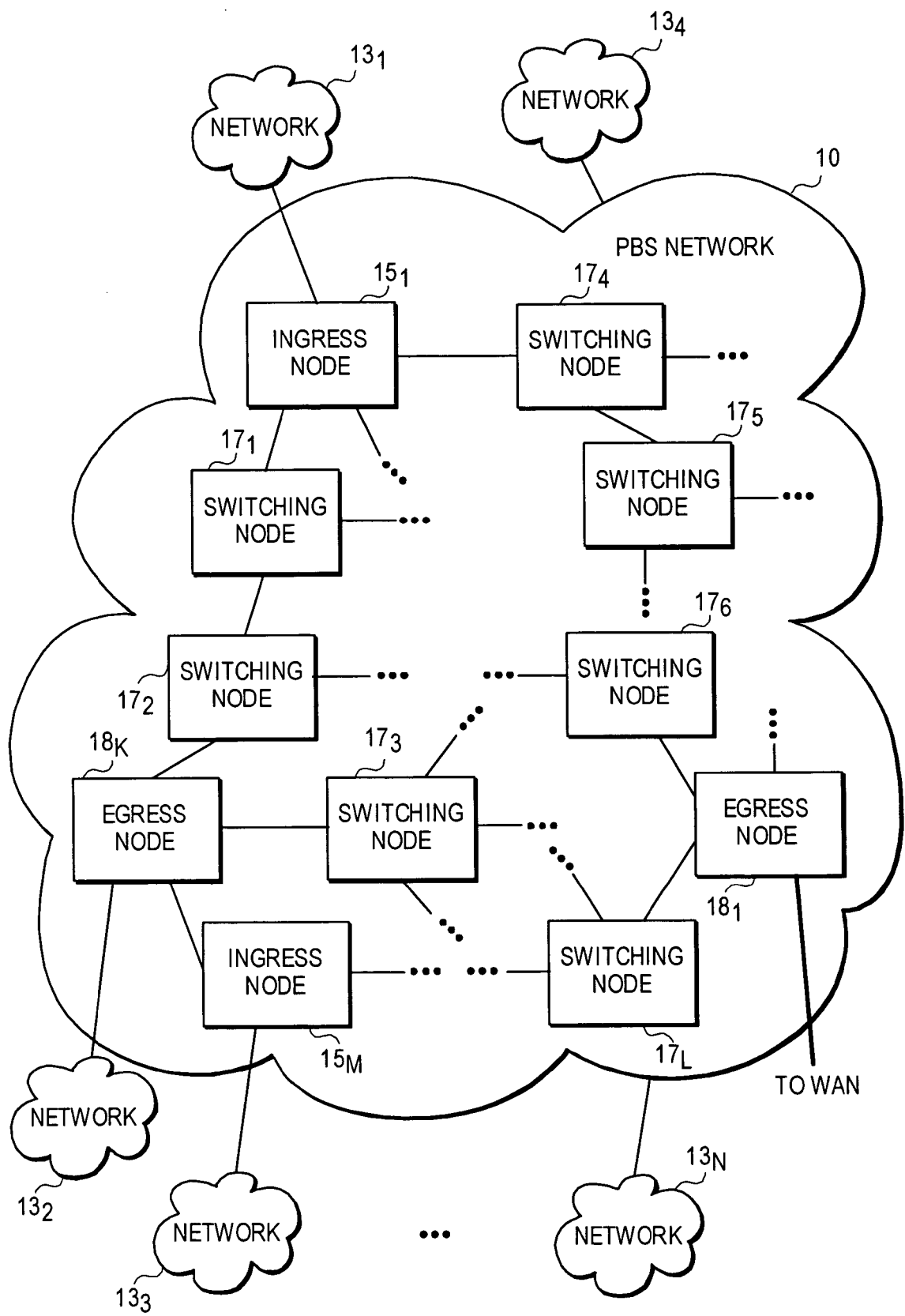
FIG. 1 is a simplified block diagram illustrating a photonic burst-switched (PBS) network with variable time slot provisioning, according to one embodiment of the present invention.

FIG. 1 illustrates an exemplary photonic burst-switched (PBS) network 10 in which embodiments of the invention described herein may be implemented. This embodiment of PBS network 10 includes local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (O-E) conversion of received optical signals, and include electronic memory to buffer the received signals until they are sent to the appropriate LAN. In addition, in some embodiments, the ingress nodes also perform electrical-optical (E-O) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node $18_1$ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data information is transmitted on separate wavelengths in some embodiments (also referred to herein as out-of-band (OOB) signaling). In other embodiments, control and data information may be sent on the same wavelengths (also referred to herein as in-band (IB) signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ are connected to corresponding ones of ingress nodes $15_1$-$15_M$. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, there are more than one lightpath to connect the switching nodes $17_1$-$17_L$ to each of the endpoints of PBS network 10 (i.e., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
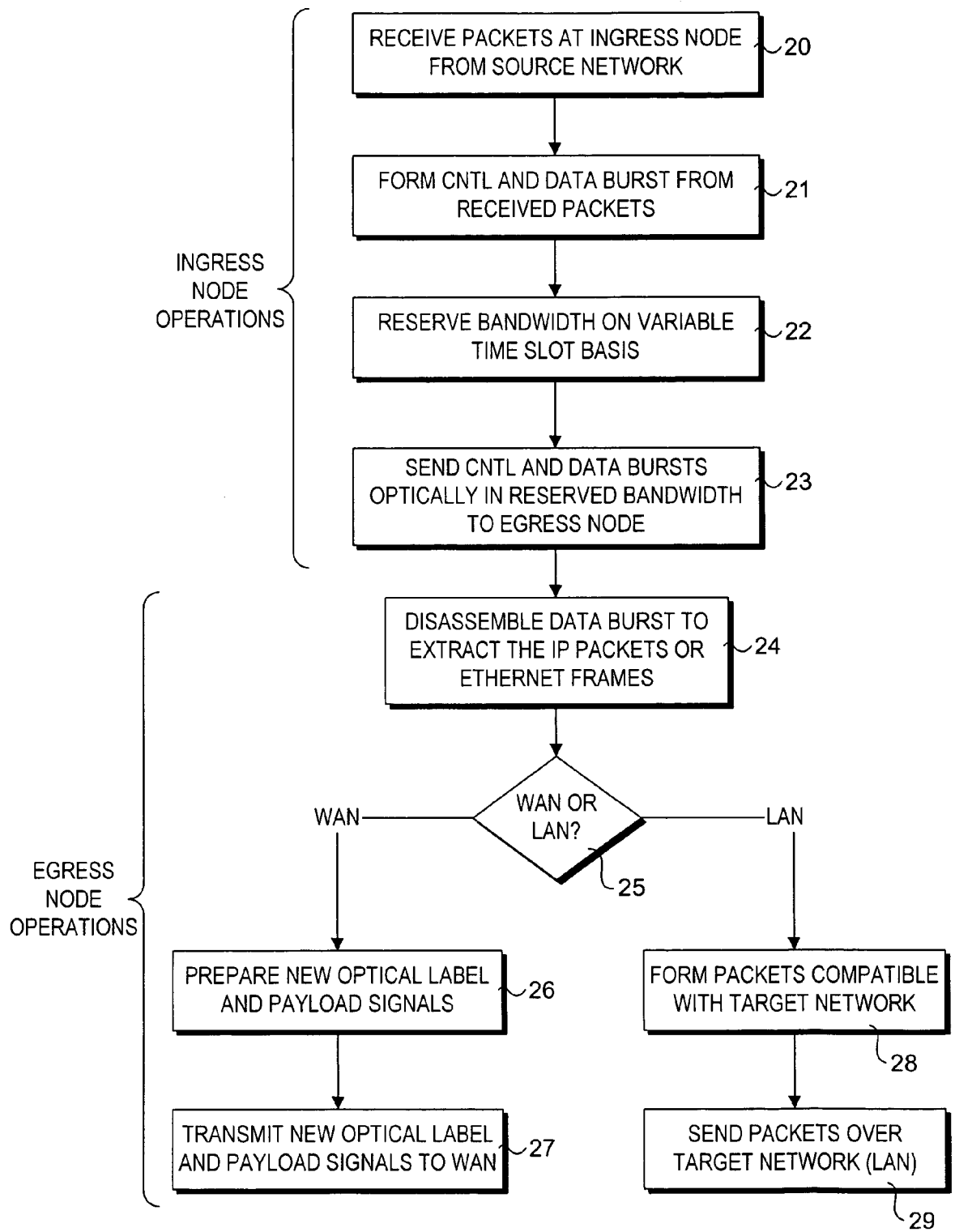
FIG. 2 is a simplified flow diagram illustrating the operation of a photonic burst-switched (PBS) network, according to one embodiment of the present invention.

FIG. 2 illustrates the operational flow of PBS network 10, according to one embodiment of the present invention. Referring to FIGS. 1 and 2, photonic burst switching network 10 operates as follows.

The process begins in a block 20, wherein PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically.

For clarity, the rest of the description of the operational flow of PBS network 10 focuses on the transport of information from ingress node $15_1$ to egress node $18_1$. The transport of information from ingress nodes $15_2$-$15_M$ to egress node $18_1$ (or other egress nodes) is substantially similar.

An optical burst label (i.e., an optical control burst) and optical payload (i.e., an optical data burst) is formed from the received packets, as depicted by a block 21. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$ on their paths to a destination can be assembled into an optical data burst payload.

Next, in a block 22, Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), which in different embodiments may be of fixed-duration or variable-duration, may be in one wavelength of one fiber, and/or can be spread across multiple wavelengths and multiple optical fibers.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes.

The optical control bursts, network management control labels, and optical data bursts are then transported through photonic burst switching network 10 in the reserved time slot or TDM channel, as depicted by a block 23. In one embodiment, ingress node $15_1$ transmits the control burst to the next node along the optical label-switched path (OLSP) determined by the network controller. In this embodiment, the network controller uses a constraint-based routing protocol [e.g., multi-protocol label switching (MPLS)] over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node $15_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information contained in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node $18_1$.

The remaining set of operations pertains to egress node operations. Upon receiving the data burst, the egress node disassembles it to extract the IP packets or Ethernet frames in a block 24. In one embodiment, egress node $18_1$ converts the optical data burst to electronic signals that egress node $18_1$ can process to recover the data segment of each of the packets. The operational flow at this point depends on whether the target network is an optical WAN or a LAN, as depicted by a decision block 25.

If the target network is an optical WAN, new optical label and payload signals are formed in a block 26. In this embodiment, egress node $18_1$ prepares the new optical label and payload signals. The new optical label and payload are then transmitted to the target network (i.e., WAN in this case) in a block 27. In this embodiment, egress node $18_1$ includes an optical interface to transmit the optical label and payload to the optical WAN.

However, if in block 25 the target network is determined to be a LAN, the logic proceeds to a block 28. Accordingly, the extracted IP data packets or Ethernet frames are processed, combined with the corresponding IP labels, and then routed to the target network (i.e., LAN in this case). In this embodiment, egress node $18_1$ forms these new IP packets. The new IP packets are then transmitted to the target network (i.e., LAN) as shown in block 29.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Figure 3:
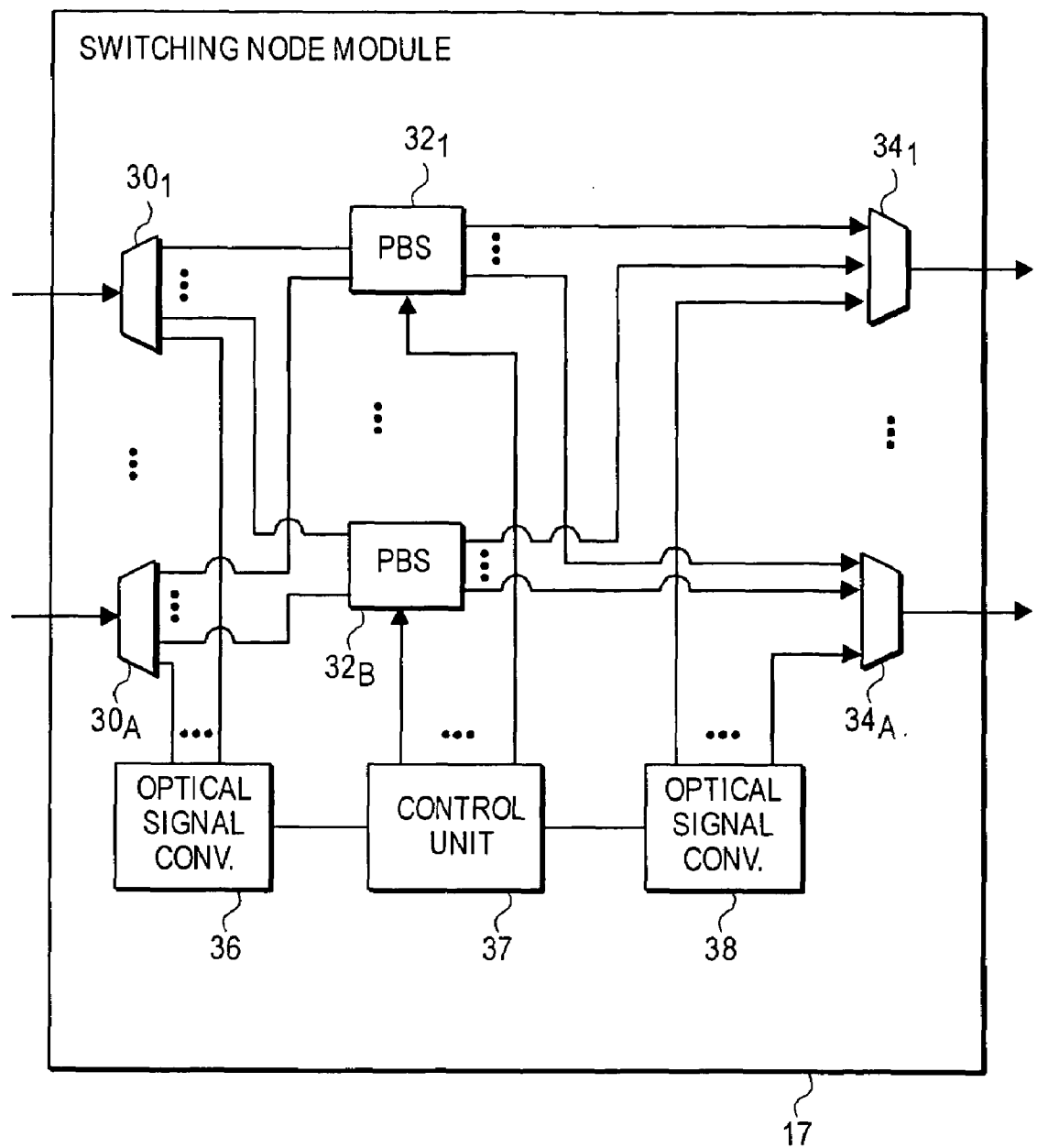
FIG. 3 is a block diagram illustrating a switching node module for use in a photonic burst-switched (PBS) network, according to one embodiment of the present invention.

FIG. 3 illustrates a module 17 for use as a switching node in photonic burst switching network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more pro-cessors to execute software or firmware programs. Further details of control unit 37 are described below.

The elements of this embodiment of module 17 are interconnected as follows. Optical demultiplexers $30_1$-$30_A$ are connected to a set of A input optical fibers that propagate input optical signals from other switching nodes of photonic burst switching network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38.

Figure 4:
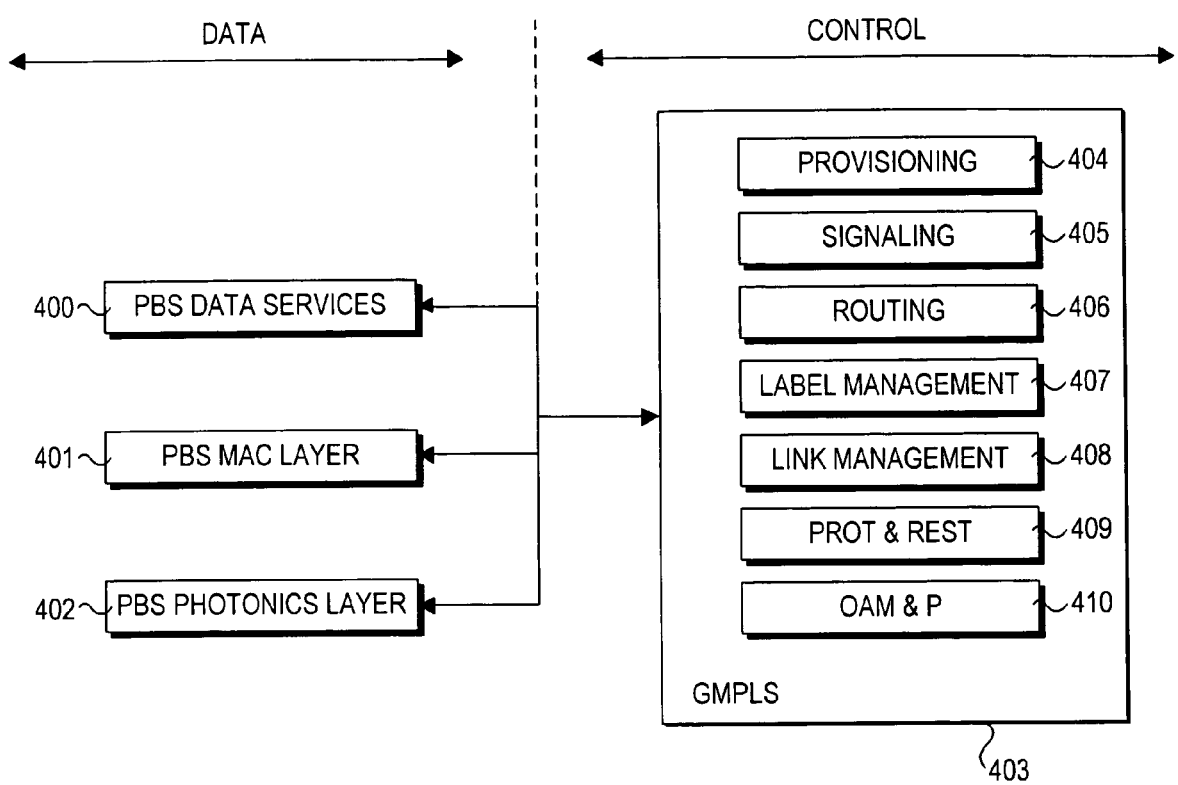
FIG. 4 is a diagram illustrating a generalized multi-protocol label switching (GMPLS)-based architecture for a PBS network, according to one embodiment of the present invention.

In accordance with further aspects of the invention, a dynamically-routed OLSP scheduling mechanism employing signaling extensions to a GMPLS-based framework for a PBS network is provided. An overview of a GMPLS-based control scheme for a PBS network in which the signaling extensions may be implemented in accordance with one embodiment is illustrated in FIG. 4. Starting with the GMPLS suite of protocols, each of the GMPLS protocols can be modified or extended to support PBS operations and optical interfaces while still incorporating the GMPLS protocols' various traffic-engineering tasks. The integrated PBS layer architecture include PBS data services layer 400 on top of a PBS MAC layer 401, which is on top of a PBS photonics layer 402. It is well known that the GMPLS-based protocols suite (indicated by a block 403 in FIG. 4) includes a provisioning component 404, a signaling component 405, a routing component 406, a label management component 407, a link management component 408, and a protection and restoration component 409. In some embodiments, these components are modified or have added extensions that support the PBS layers 400-402. Further, in this embodiment, GMPLS-based suite 403 is also extended to include an operation, administration, management and provisioning (OAM&P) component 410. Further information on GMPLS architecture can be found at http://www.ietf.org/internet-drafts/draft-ietf-ccamp-gmpls-architecture-07.txt. In addition, a functional description of basic GMPLS signaling can be found at http://www.ietforg/rfc/rfc3471.txt.

In accordance with one aspect of the invention, signaling component 405 can include extensions specific to PBS networks such as, for example, burst start time, burst type, burst length, and burst priority, etc. As described in further detail below, GMPLS signaling extensions are disclosed for enabling reservation scheduling using the RSVP-TE (ReSerVation Protocol-Traffic Engineering) protocol. Link management component 408 can be implemented based on the well-known link management protocol (LMP) (that currently supports only SONET/SDH networks), with extensions added to support PBS networks. Protection and restoration component 409 can, for example, be modified to cover PBS networks. Further information on LMP can be found at http://www.ietf.org/internet-drafts/draft-ietf-ccamp-lmp-09.txt.

Label management component 407 can be modified to support a PBS control channel label space as well. In one embodiment, the label operations are performed after control channel signals are O-E converted. The ingress nodes of the PBS network act as label edge routers (LERs) while the switching nodes act as label switch routers (LSRs). An egress node acts similarly to an egress LER, continuously providing labels for the PBS network. An ingress node can propose a label to be used on the lightpath segment it is connected to, but the downstream switching node will be the node that ultimately selects a label value, potentially rejecting the proposed label and selecting its own label. In general, a label list can also be proposed by an edge or switching node to its downstream switching node. This component can advantageously increase the speed of control channel context retrieval (by performing a pre-established label look-up instead of having to recover a full context). Further details of label configuration and usage are discussed in co-pending U.S. patent application Ser. No. 10/606,323.

To enable PBS networking within hop and span-constrained networks, such as enterprise networks and the like, it is advantageous to extend the GMPLS-based protocols suite to recognize the PBS optical interfaces at both ingress/egress nodes and switching nodes. Under the GMPLS-based framework, the PBS MAC layer is tailored to perform the different PBS operations while still incorporating the MPLS-based traffic engineering features and functions for control burst switching of coarse-grain (from seconds to days or longer) optical flows established using a reservation protocol and represented by a PBS label.

Figure 5:
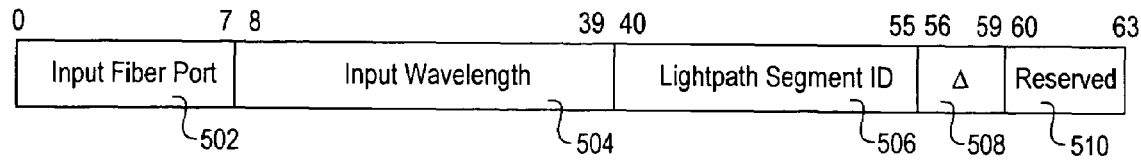
FIG. 5 is a block diagram illustrating GMPLS-based PBS label format, according to one embodiment of the present invention.

In important aspect of the present invention pertains to label signaling, whereby coarse-grain lightpaths are signaled end-to-end and assigned a unique PBS label. The PBS label has only lightpath segment significance and not end-to-end significance. In exemplary PBS label format 500 is shown in FIG. 5 with its corresponding fields, further details of which are discussed below. The signaling of PBS labels for lightpath set-up, tear down, and maintenance is done through an extension of IETF (Internet Engineering Task Force) Resource Reservation Protocol-Traffic Engineering (RSVP-TE). More information on GMPLS signaling with RSVP-TE extensions can be found at http://www.ietf.org/rf/rfc3473.txt.

The PBS label, which identifies the data burst input fiber, wavelength, and lightpath segment, optical channel spacing, is used on the control path to enable one to make soft reservation request of the network resources (through corresponding Resv messages). If the request is fulfilled (through the Path message), each switching node along the selected lightpath commits the requested resources, and the lightpath is established with the appropriate segment-to-segment labels. Each switching node is responsible for updating the initial PBS label through the signaling mechanism, indicating to the previous switching node the label for its lightpath segment. If the request cannot be fulfilled or an error occurred, a message describing the condition is sent back to the originator to take the appropriate action (i.e., select another lightpath characteristics). Thus, the implementation of the PBS label through signaling enables an efficient MPLS type lookup for the control burst processing. This processing improvement of the control burst at each switching node reduces the required offset time between the control and data bursts, resulting in an improved PBS network throughput and reduced end-to-end latency.

In addition to the software blocks executed by the PBS control processor, there are several other key components that support PBS networking operations described herein. Link Management component 408 is responsible for providing PBS network transport link status information such as link up/down, loss of light, etc. The component runs its own link management protocol on the control channel. In one embodiment, the IETF link management protocol (LMP) protocol is extended to support PBS interfaces. Link protection and restoration component 409 is responsible for computing alternate optical paths among the various switching nodes based on various user-defined criteria when a link failure is reported by the link management component. OAM&P component 410 is responsible for performing various administrative tasks such as device provisioning.

Additionally, routing component 406 provides routing information to establish the route for control and data burst paths to their final destination. For PBS networks with bufferless switch fabrics, this component also plays an important role in making PBS a more reliable transport network by providing backup route information that is used to reduce contention.

The label signaling scheme of the present invention reduces the PBS offset time by reducing the amount of time it takes to process a signaled lightpath. This is achieved by extending the GMPLS-based framework to identify each lightpath segment within the PBS network using a unique label defined in a PBS label space. The use of a PBS label speeds up the PBS control burst processing by allowing the control interface unit within the PBS switching node, which processes the control burst, to lookup relevant physical routing information and other relevant processing state based on the label information used to perform a fast and efficient lookup. Thus, each PBS switching node has access in one lookup operation to the following relevant information, among others: 1) the address of the next hop to send the control burst to; 2) information about the outgoing fiber and wavelength; 3) label to use on the next segment if working in a label-based mode; and 4) data needed to update the scheduling requirement for the specific input port and wavelength.

Returning to FIG. 5, in one embodiment PBS label 500 comprises five fields, including an input fiber port field 502, an input wavelength field 504, a lightpath segment ID field 506, an optical channel spacing ($\Delta$) field 508, and a reserved field 510. The input fiber port field 502 comprises an 8-bit field that specifies the input fiber port of the data channel identified by the label (which itself is carried on the control wavelength. The input wavelength field 504 comprises a 32-bit field that describes the input data wavelength used on the input fiber port specified by input fiber port field 502, and is described in further detail below. The lightpath segment 1D field 506 comprises a 16-bit field that describes the lightpath segment ID on a specific wavelength and a fiber cable. Lightpath segment ID's are predefined values that are determined based on the PBS network topology. The channel spacing field 508 comprises a 4-bit field used for identifying the channel spacing (i.e., separation between adjacent optical channels) in connection with the $\Delta$ variable defined below. The reserved field 510 is reserved for implementation-specific purposes and future expansion.

In one embodiment, the input wavelength is represented using IEEE (Institute of Electrical and Electronic Engineers) standard 754 for single precision floating-point format. The 32-bit word is divided into a 1-bit sign indicator S, an 8-bit biased exponent e, and a 23-bit fraction. The relationship between this format and the representation of real numbers is given by:

$$\text{Value} = \begin{cases} (-1)^S \cdot (2^{e-127}) \cdot (1+f) & \text{normalized, } 0 < e < 255 \\ (-1)^S \cdot (2^{e-126}) \cdot (0+f) & \text{denormalized, } e = 0, f > 0 \\ \text{exceptional value} & \text{otherwise} \end{cases} \quad \text{Eq. (1)}$$

One of the optical channels in the C band has a frequency of 197.200 THz, corresponding to a wavelength of 1520.25 nm. This channel is represented by setting s=0, e=134, and f=0.540625. The adjacent channel separation can be 50 GHz, 100 GHz, 200 GHz, or other spacing. For 50 GHz channel separation, it can be written as: $\Delta=0.05=1.6 \cdot 2^{-5}$ (s=0, e=122, f=0.6). Thus, the frequency of the nth channel is given by:

$$f(n)=f(1)-(n-1)\cdot\Delta \quad \text{Eq. (2)}$$

Thus, according to equation (2), the optical channel frequency is given by n and the specific value of Δ, which can be provided as part of the initial network set-up. For example, using the standard ITU-T (International Telecommunications Union) grid C and L bands, n is limited to 249, corresponding to an optical frequency of 184.800 THz. However, other optical channel frequencies outside the above-mentioned range or other wavelength ranges such as wavelength band around 1310 nm can be also defined using equation (2).

Figure 6:
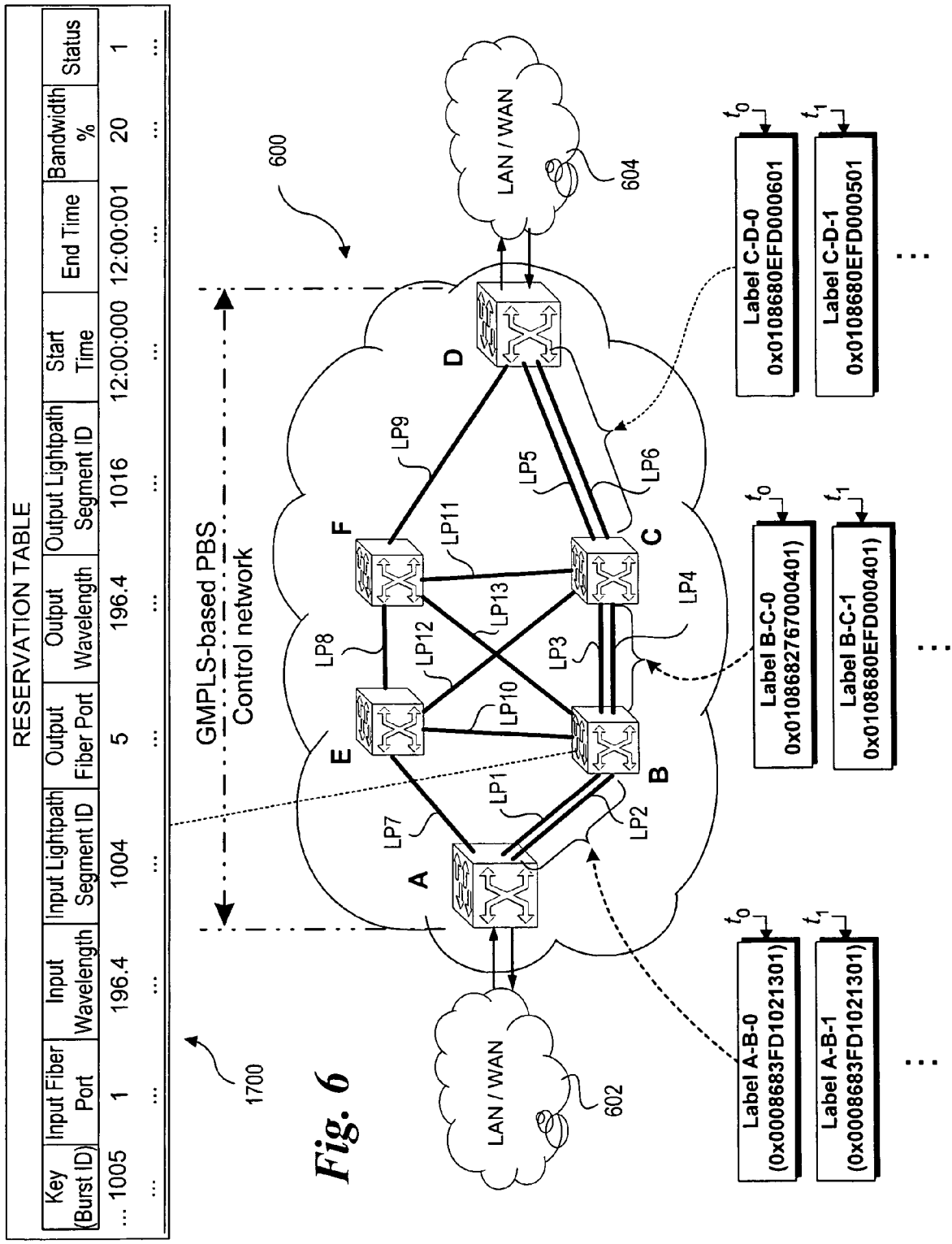
FIG. 6 is a schematic diagram illustrating an exemplary set of GMPLS-based PBS labels employed in connection with routing data across a GMPLS-based PBS control network.

Operation of how PBS label 500 is implemented in a GMPLS-based PBS network 6500 is illustrated in FIG. 6. Network 600, which may comprise one of various types of networks, such as an enterprise network, contains four PBS switching nodes, labeled B, C, E, and F, and two edge nodes labeled A and D. Network 600 is coupled at one end to a LAN or WAN network 602 and a LAN or WAN network 604 at another end, wherein nodes A and D operate as edge nodes. For the following example, it is desired to route traffic from network 602 to network 604. Accordingly, edge node A (i.e., the source node) operates as an ingress node, while edge node D (i.e., the destination node) operates as an egress node.

The various switching nodes B, C, E, and F are coupled by lightpath segments LP1-LP13, as shown in FIG. 6. A lightpath segment comprises an optical connection via optical fibers between any adjacent nodes. A lightpath comprises the optical path traveled between source and destination nodes, and typically will comprises a concatenation of a plurality of lightpath segments. In the illustrated example discussed below, one of the lightpaths between the source node (ingress node A) and the destination node (egress node D) comprises lightpath segments LP1, LP4, and LP6.

As further shown in FIG. 6, exemplary PBS labels A-B-0 and A-B-1 are assigned to the path between nodes A and B at times $t_0$ and $t_1$, respectively; labels B-C-0 and B-C-1 are assigned to the path between nodes B and C nodes at times $t_0$ and $t_1$; and labels C-D-0 and C-D-1 are assigned to the path between nodes C and D nodes at times $t_0$ and $t_1$. For the purpose of simplicity, the lightpath segment ID's for lightpath segments LP1, LP2, LP3, LP4, LP5 and LP6 are respectively defined as 0x0001, 0x0002, 0x0003, 0x0004, 0x0005, and 0x0006. In accordance with foregoing aspects of PBS networks, a particular LSP may comprise lightpath segments employing a single wavelength, or different wavelengths. For example, in the illustrated example, label A-B-0 defines the use of an optical frequency of 197.2 THz (0x08683FDI), label B-C-0 defines the use of a frequency of 196.4 THz (0x08682767), and label C-D-0 defines the use of a frequency of 195.6 THz (0x08680EFD). On the way from A to D the signaling packet requests resource reservation on a lightpath segment-by-segment basis (i.e. LP1, LP4, and LP6). For example, edge node A requests resources to create a coarse-grain reservation of a selected lightpath. On the first lightpath segment, switching node B checks if it has sufficient resources to satisfy the request. If it doesn't have the resources, it sends an error message back to the originator of the request to take the appropriate action such as send another request or select another lightpath. If it has enough resources, it makes a soft reservation of these resources, and forwards it to the next switching node, wherein the operations are repeated until the destination node D is reached. When node D receives the soft reservation request, it checks if it can be fulfilled.

To support reservation signaling, a signaling mechanism is implemented that employs extensions to the Resource reSerVation Protocol-Traffic Engineering (RSVP-TE). In general, the RSVP-TE protocol is itself an extension of the RSVP protocol, as specified in IETF RFC 2205. RSVP was designed to enable the senders, receivers, and routers of communication sessions (either multicast or unicast) to communicate with each other in order to set up the necessary router state to support various IP-based communication services. RSVP identifies a communication session by the combination of destination address, transport-layer protocol type, and destination port number. RSVP is not a routing protocol, but rather is merely used to reserve resources along an underlying route, which under conventional practices is selected by a routing protocol.

Figure 7:
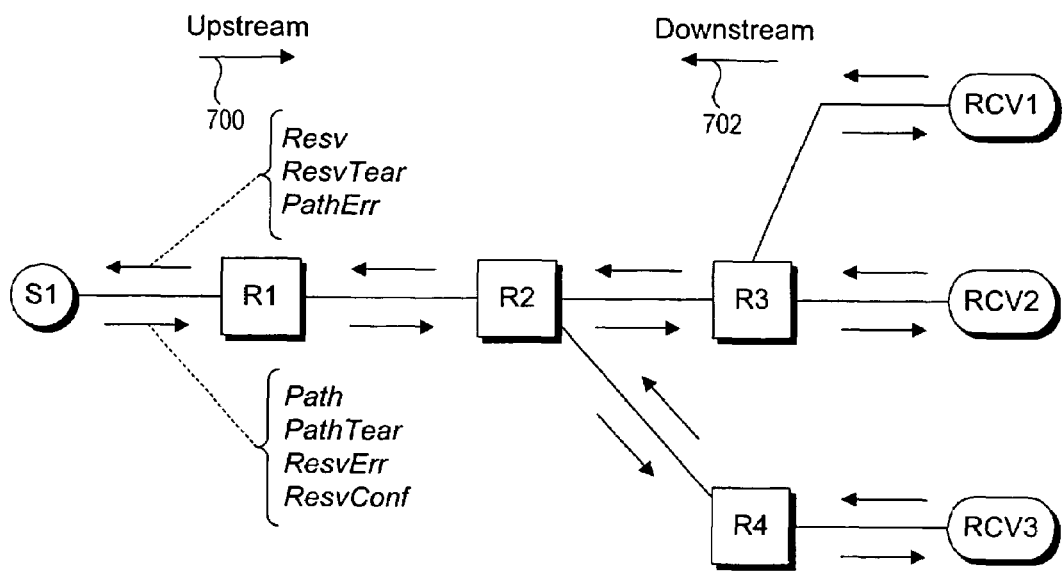
FIG. 7 is a block diagram illustrating message flows in connection with RSVP messages.

FIG. 7 shows an example of RSVP for a multicast session involving one traffic sender S1, and three traffic receivers, RCV1, RCV2, and RCV3. The diagram in FIG. 7 is illustrative of the general RSVP operations, which may apply to unicast sessions as well. Upstream messages 700 and downstream messages 702 sent between sender S1 and receivers RCV1, RCV2, and RCV3 are routed via routing components (e.g., switching nodes) R1, R2, R3, and R4. The primary messages used by RSVP are the Path message, which originates from the traffic sender, and the Resv message, which originates from the traffic receivers. The primary roles of the Path message are first to install reverse routing state in each router along the path, and second to provided receivers with information about the characteristics of the sender traffic and end-to-end path so that they can make appropriate reservation requests. The primary role of the Resv message is to carry reservation requests to the routers along the distribution tree between receivers and senders.

Connection creations requests are issued via a Path message. Details of a Path message 800 with signaling extensions in accordance with an embodiment of the invention is shown in FIGS. 8*a-c*. For clarity, Path message 800 only shows fields that are pertinent to reservation signaling mechanism described herein; it will be understood that the Path message may further include additional fields specified by the RSVP-TE protocol. Also for clarity, fields that are augmented or added to the standard RSVP-TE data structures are shown in bold. Finally, objects contained in square brackets ([ . . . ]) are optional.

The illustrated objects of Path message 800 include a Common Header 802, an optional Integrity object 804, a Session object 806, an RSVP_Hop object 808, a Time_Values object 810, an optional Explicit_Route object 811, a generalized PBS_Label_Request object 812, an optional Label_Set object 814, an optional Admin_Status object 816, a Destination_PBS_address object 818, a Source_PBS_Address object 820, an optional Policy_Data object 822, and a sender descriptor object 824.

The optional Integrity object 804 carries cryptographic data to authenticate the originating node and to verify the contents of the RSVP message. The Session object 806 contains the IP destination address (Dest Address), the IP protocol ID, and some form of generalized destination port, to define a specific session for the other objects to follow. In one embodiment, the information identifying an Internet Protocol version 4 (IPv4) session, is stored in Session object 806. Optionally, Internet Protocol version 6 (IPv6) may be employed.

RSVP_Hop object 808 carries the IP address of the RSVP-capable node that sent the message (the most recent in the chain of nodes) and a logical outgoing interface handle LIH. RSVP_Hop objects for downstream messages are known as PHOP ("previous hop") objects, while upstream RSVP_Hop objects are known as NHOP ("next hop") objects. Thus PHOP RSVP_Hop objects are labeled 808P, while NHOP RSVP_Hop objects are labeled 808N herein.

Under conventional practice, Time_Values object 810 would contain the value for the refresh period used by the creator of the message. However, in accordance with principles of the invention, the object is used to store time values specifying the start and end of an OLSP reservation.

The signaling protocol also supports explicit routing. This is accomplished via the explicit route object 811. This object encapsulates a concatenation of hops that constitute the explicitly routed path. Using the object, the paths taken by label-switched RSVP-MPLS flows can be pre-determined, independent of conventional IP routing. The explicitly routed path can be administratively specified, or automatically compute by a suitable entity based on QoS (Quality of Service) and policy requirements, taking into consideration the prevailing network state. In general, path computation can be control-driven or data-driven.

Figures 9, 10A, 10B:
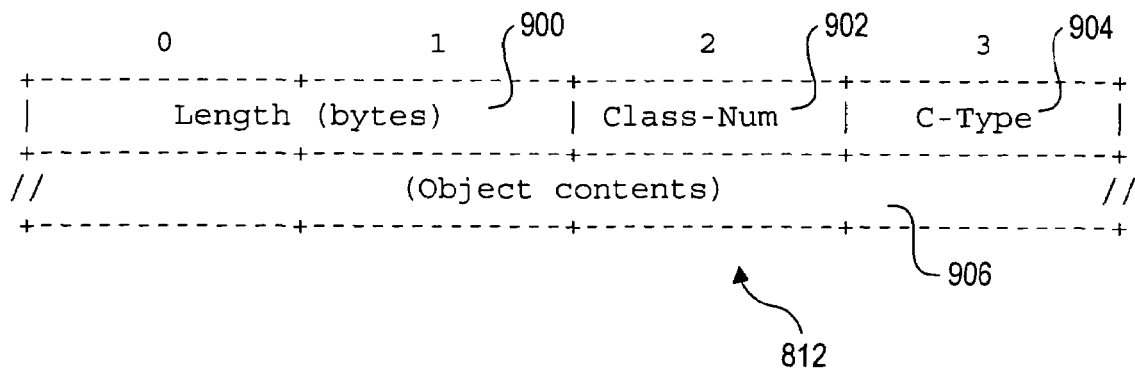

Details of a generalized PBS_Label_Request object 812 format in accordance with one embodiment are shown in FIG. 9. The object's format includes a length field 900, a Class-Num field 902, a C-Type field 904, and object contents 906. The values in both Class-Num field 902 and C-Type field 904 are constants that are standardized once a protocol goes through the standard track. In one embodiment, object contents 906 include a PBS label having a format shown in FIG. 5 and described above.

The Label_Set object 814 is used to limit the label choices of a downstream node to a set of acceptable labels. This limitation applies on a per hop basis. RFC 3271 discusses four cases where a label set is useful in the optical domain. The first case is where the end equipment is only capable of transmitting on a small specific set of wavelengths/bands. The second case is where there is a sequence of interfaces that cannot support wavelength conversion (CI-incapable) and require the same wavelength be used end-to-end over a sequence of hops, or even an entire path. The third case is where it is desirable to limit the amount of wavelength conversion being performed to reduce the distortion on the optical signals. The last case is where two ends of a link support different sets of wavelengths.

The Label_Set object 814 is used to restrict label ranges that may be used for a particular LSP between two peers. The receiver of a Label_Set must restrict its choice of labels to one which are specified in the Label_Set 814. Much like a label, a Label_Set 814 may be present across multiple hops. In this case each node generates its own outgoing Label_Set, possibly based on the incoming Label_Set and the node's hardware capabilities. This case is expected to be the norm for nodes with conversion-incapable (CI-incapable) interfaces. The use of the Label_Set 814 is optional; if not present, all labels from the valid label range may be used. Conceptually the absence of a specific Label_Set object implies a Label_Set object whose value is {U}, the set of all valid labels.

The Admin_Status object 816 is used to notify each node along the path of the status of an LSP. Status information is processed by each node based on local policy and the propagated in the corresponding outgoing messages. The object may be inserted in either Path or Resv messages at the discretion of the ingress (for Path messages) or egress (for Resv messages) nodes.

The Destination_PBS_Address object 818 contains the IP address of the destination node (i.e., the egress node). As discussed above, this information may be provided in the session object; for clarity it is shown as separate data in FIG. 8a. Similarly, the Source_PBS_Address object 820 contains the IP address of the source node (i.e., the ingress node).

Further details of sender descriptor 824 for unidirectional and bi-directional PBS light paths are respectively shown in FIGS. 8a and 8b. FIG. 8a shows a unidirectional sender descriptor 824A that includes a sender template object 826 and a PBS_Sender_TSpec object 828. The bi-directional sender descriptor 824B further includes an upstream label 830 in addition to a sender template object 826 and a PBS_Sender_TSpec object 828.

FIGS. 10a and 10b illustrate the various objects of a Resv message 1000 in accordance with one embodiment. As with conventional RSVP practice, a Resv message is issued by a receiving node in response to a Path message. Accordingly, Resv message 1000 shares many object with Path message 800, including a common header 802, Integrity object 804, Session object 806, RSVP_Hop object 808, Time_Values object 810, Admin_Status object 816, and Policy_Data object 822. In addition, Resv message 1000 a reservation configuration object 1004, a Style object 1006, and a flow descriptor object 1008.

Reservation confirmation object (Resv_Confirm) 1004 holds data that is used to confirm a reservation for a corresponding PBS resource. Further details of resource reservations are described below. Style object 1006 contains data identifying the reservation style, i.e., FF (Fixed Filter—distinct reservation and explicit sender selection), SE (Shared Explicit—shared reservation and explicit sender selection), and WF (Wildcard Filter—shared reservation and wildcard sender selection).

Flow descriptor 1008 contains objects for describing data flows. These objects include a PBS_Flowspec 1010, a Filter_Spec 1012, and a Generalized_PBS_Label 1014.

A Path Tear message 1100 employed to request the deletion of a connection is shown in FIG. 11. The PathTear message 1100 includes objects that are corollary with Path message 800. These objects include a Common Header 802, an optional Integrity object 804, a Session object 806, an RSVP_Hop object 808, and optional Admin_Status 816, and a sender descriptor 824.

A ResvTear message 1200 issued in response to a Path-Tear message 1100 is shown in FIG. 12. The ResvTear message 1200 includes a Common Header 802, an optional Integrity object 804, a Session object 806, an RSVP_Hop object 808, and optional Admin_Status 816, a Style object 1006, and a flow descriptor 1200.

A common format is employed for PBS_Sender_TSpec object 828 and PBS_Flowspec object 1010. Each object includes a length field 1300, a Class-Num field 1302, a C-Type field 1304, object contents 1306, a reserved field 1308, and a bandwidth % field 1310. PBS_Send_TSpec objects 828 and PBS_Flowspec objects 1010 can be identified by their respective Class-num/C-Type values. The value in bandwidth % field 1310 represents the amount of bandwidth expressed by the intermediate node as a percent of the available bandwidth on a given lightpath segment. An intermediate node (i.e., a switching node) normalizes this percentage to the available bandwidth of its outgoing link. This enables each of the switching nodes to build-up its bandwidth allocation table for all the incoming label requests and determine if it can satisfy each bandwidth request.

In one embodiment, known as PBS overlay routing, lightpaths are reserved using a hop-by-hop routing determination scheme that is analogous to conventional packet routing (e.g., in IP networks). With reference to the flowchart of FIGS. 14*a* and 14*b*, operations and logic performed during a lightpath reservation process in accordance with one embodiment of PBS overlay routing proceeds as follows. The process beings in a block 1400, wherein each switching node builds a "fixed" routing tree (embodied as a table) defining the available routes between other nodes based on the network topology at the time the routing trees are built. In essence, each route corresponds to a lightpath spanning a concatenation of one or more hops (between adjacent nodes) that are traversed to transmit data from the switching node maintaining the routing data to one or more destination (edge) nodes.

Figure 15:
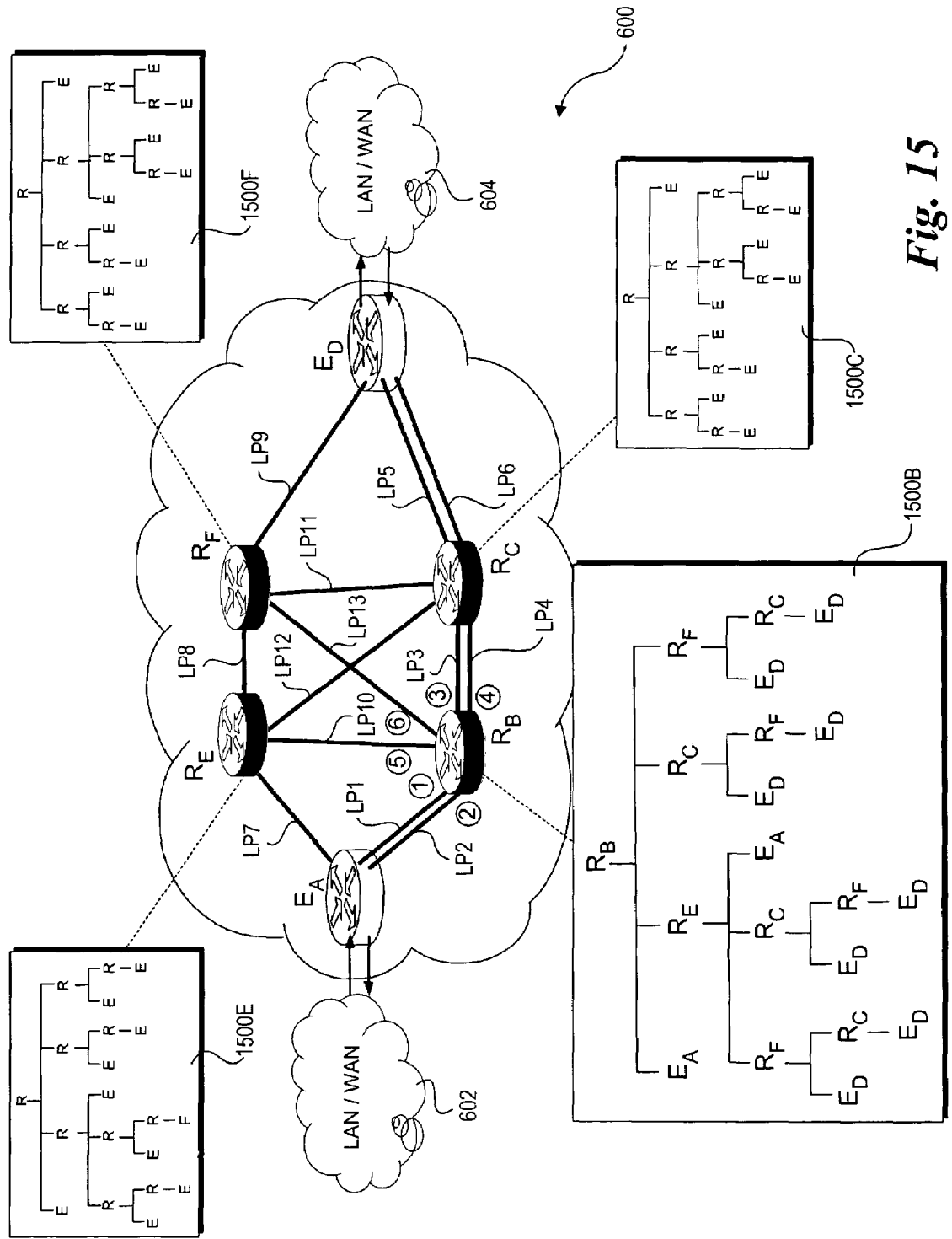
FIG. 15 is a schematic diagram that is analogous to the GMPLS-based PBS control network of FIG. 6, wherein the network nodes have been replaced with routers, and including details of an exemplary routing tree generated at a switching node.

For example, a routing tree 1500B illustrative of an exemplary set of routing data contained in a fixed topology routing tree table is shown in FIG. 15. In this embodiment, each of switching nodes B, C, E, and F are modeled as respective routers $R_B$, $R_C$, $R_E$, and $R_F$, while the edge nodes A and D are respectively labeled $E_A$ and $E_D$. The routing tree 1500B graphically depicts the necessary hops from router $R_B$ (i.e., switching node B) to reach edge nodes $E_A$ and $E_D$. The bottom node along each "branch", also known as a "leaf" node, represents the destination, while the topmost node ($R_B$ in this instance) represents the "root" of the routing tree. In general, circular or circuitous routes are not to be included in the routing tree table, as such routing is very inefficient. For example, a route between switching node C and edge node D spanning $R_C$-$R_E$-$R_B$-$R_F$-$E_D$ should not be included, even though it is a possible route between nodes C and D. Similar routing tables corresponding to routing trees 1500C, 1500E and 1500F are built at routers $R_C$, $R_E$, $R_F$, respectively. Techniques for building routing trees of this type are well-known in the networking art.

After the routing table trees are built, continuous network operations are ready to be performed. During these operations, attempts are made to schedule a lightpath using a resource reservation message that is routed on a hop-by-hop basis, wherein the final route configuration is determined as a function of preferred routing criteria (e.g., shortest route) in combination with current resource availability.

The process begins at the source node, as identified by a start block 1401. In this example, it is desired to route traffic from a source or ingress edge node A to a destination egress edge node D. In a block 1402, a next hop for routing the reservation message is identified. In general, the edge nodes will only be aware of adjacent switching nodes, and need not know anything further about the network topology. Accordingly, determination of the next hop node for the first hop will be performed without considering downstream resource availability. In one embodiment, an edge node will maintain a resource reservation table that is analogous to the switching node resource reservation table described below (FIG. 17), except a given reservation record will only include information pertaining to an outgoing traffic reservation or an incoming traffic reservation. Since an outgoing traffic reservation has a corollary incoming traffic reservation at the next hop (downstream node) and an incoming traffic reservation has a corollary outgoing traffic reservation at a previous hop (upstream node), the edge node (and, in fact, all nodes) is aware of the availability of a shared optical link (lightpath segment and wavelength) between adjacent nodes. The net result is that the first next hop will be determined based on the availability of an optical link between the source node and the first hop node.

Figure 16:
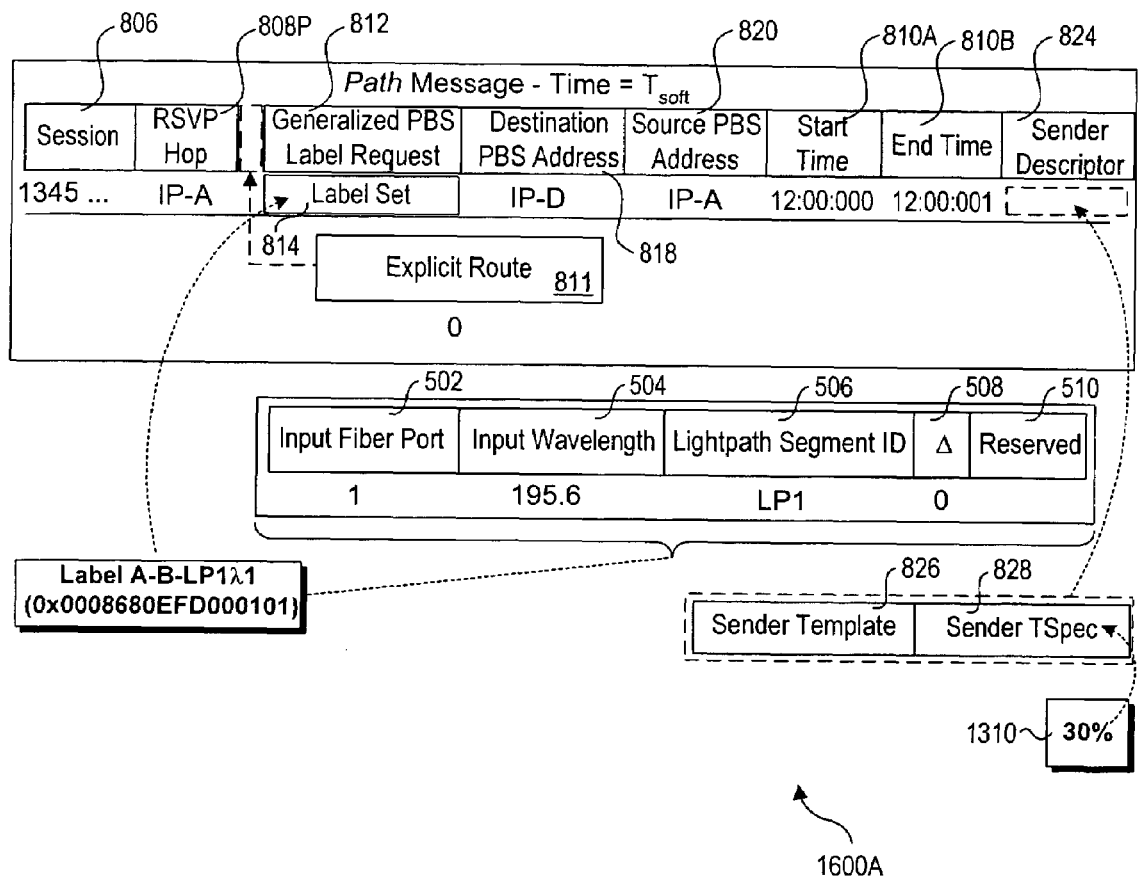

Next, in a block 1403, a first Path message is generated, which includes an embedded PBS label for making a reservation of the next hop. In this example, the first next hop is router $R_B$ using lightpath segment LP1. FIG. 16 shows details of an exemplary Path message 1600 corresponding to a first pass of the resource reservation process. The destination PBS address 818 contains the IP address of the destination node D, while source PBS address 820 contains the IP address of source node A. Since the most recent node to forward the message is the source node A, RSVP_Hop object 808P contains the IP address for node A.

Information specifying the lightpath segment and wavelength for the first hop is contained in a label A-B-LP1λ1, stored in label set 814 under generalized PBS label request object 812. Each label includes information identifying an input fiber port for the receiving node (e.g., input fiber port 1 of switching node B), an input wavelength under which data signals will be transmitted on the fiber coupled to the input fiber port (195.6 THz) (it is noted that the input wavelength is actually determined as a function of the values in input wavelength field 504 and Δ field 508, as discussed above—a specific value is used here for illustrative purposes), and the lightpath segment ID (e.g., LP1) for the lightpath coupled between the sending and receiving nodes.

As discussed above, the reservations to be made comprise time slot reservations corresponding to future scheduled uses of virtual network links comprising lightpaths made up of multiple concatenated lightpath segments. Accordingly, time period data corresponding to Time_Values object 810 comprising a start and end time for a corresponding reservation time slot are respectively stored in a start time object 810A and an end time object 810B. For illustrative purposes, the start time depicts 12:00:000 (i.e. 12 noon) and 12:00:001 (100 milliseconds after 12 noon); in an actual implementation, date information may be included as well, either in the same fields or additional fields.

Explicit route information may be contained in Explicit_Route object 811. In this instance, the Explicit_Route 811 contains a 0, indicating that an explicit route is not defined.

In accordance with another aspect of the invention, reservations for the use of lightpath segments used to make up a given lightpath may be defined such that only a partial amount of the channel bandwidth is used. As discussed above, information defining a bandwidth % for the reservation may be stored in bandwidth % field 1310 of sender descriptor object 824. Reservation for a resource request that consumes less than or equal to the total available bandwidth for a given resource are accepted, while requests that would consume unavailable bandwidth will be denied.

Once the Path message is created, it is sent to the next hop. The next set of operations and logic are performed in a looping manner, as indicated by start and end loop blocks 1404 and 1405, starting at switching node B, which comprises the first switching node on the ingress side of the lightpath. The operations defined between start and end loop blocks 1404 and 1405 are performed in an iterative manner for each switching node, until the last lightpath segment has been evaluated for availability. As used herein, the term "current node" identifies that the operations are being performed at a node for which the evaluated lightpath segment is received. The term "next node" represents the next node in the lightpath segment chain, while "previous node" represents the node that was evaluated prior to the current node. When the logic loops back to start loop block 1404 from end loop block 1405, the next node becomes the current node.

In a block 1406, the Path message is processed at the receiving node to extract a destination address and corresponding resource reservation request for the node, based on the Path message objects and the embedded PBS label. For example, at this point switching node B has received a resource reservation request to reserve 30% of the signal bandwidth at a frequency of 195.6 THz for lightpath segment LP1 during the time slot from 12:00:000 to 12:00:001. The next hop is then determined based on the best available route to the destination node defined in the routing tree table for the node. Normally, the best available route will correspond to the route with the shortest path. In this example, the shortest path between route $R_B$ (switching node B) and edge node $E_D$ (the destination node) would span $R_B$-$R_C$-$E_D$. The next hop is thus, $R_C$, or switching node C.

Once the next hop for the best available route is made, a determination is made to whether the next hop has sufficient resources to satisfy the reservation request in a decision block 1408. For example, a determination would be made to whether sufficient bandwidth percentage was available for the time slot based on a combination of fiber link (lightpath segment) and wavelength. Thus, a determination would be made in decision block 1408 to whether either of lightpath segments LP3 or LP4 could support the requested reservation. The availability information can be determined based on information contained in the resource reservation table for the current node, as described below.

An indication of sufficient resources means that the specified resource (i.e., the bandwidth request at the wavelength for the lightpath segment received at the next hop node) has not been previously scheduled for use over any portion of the specified time period. In one embodiment, this information may be determined based on resource reservation lookup tables stored at each node, as exemplified by a resource reservation table 1700 shown in FIG. 17a. The resource reservation table contains data pertaining to "soft" (requested, but yet to be confirmed) and "hard" (confirmed) reservations for the various transmission resources provided by the node. Reservation table 1700 includes a plurality of columns in which data are stored in rows, wherein data for a given row is called a "record," and the columns for a given record comprise data fields. The columns include an optional Key column 1702, an Input Fiber Port column 1704, an Input Wavelength column 1706, an optional Input Lightpath Segment ID column 1708, an Output Fiber Port column 1710, and Output Wavelength column 1712, an optional Output Lightpath Segment ID column 1714, a Start Time column 1716, and End Time column 1718, a Bandwidth % column 1720, and a Status column 1220.

In general, Key column 1702 is used to store a unique identifier (key) for each record, enabling quick retrieval of records and guaranteeing record uniqueness. In one embodiment, the key contains information corresponding to the session object 806 of the Path message. In another embodiment, the key is derived from a combination of data in fields corresponding to the PBS label (i.e., in input fiber port column 1704, input wavelength column 1706, and lightpath segment ID column 1708). This enables quick lookup of reservation entries in response to processing control bursts containing specific PBS resource allocation requests.

Data relating to incoming link parameters are stored in Input Fiber Port column 1704, Input Wavelength column 1706, and, optionally, Input Lightpath Segment ID column 1708, while data relating to outgoing link parameters are stored in Output Fiber Port column 1710, Output Wavelength column 1712, and, optionally, Output Lightpath Segment ID column 1714. Each switching node is coupled to two or more fiber links via respective I/O ports. For example, the exemplary data in reservation table 1700 corresponds to switching node B, which includes six network input/output (I/O) ports, depicted as encircled numbers 1-6 in FIG. 15. The value in Input Fiber Port column 1704 identifies the I/O port at which data is received by the particular switching node maintaining the reservation table, while the value in Output Fiber Port column 1710 identifies the I/O port via which data is transmitted. As an option, input and output fiber routing data may be stored through reference to input and output lightpath segments, in lieu of or in addition to specifying I/O ports. Accordingly, in one embodiment, data identifying the input and output lightpath segments is stored in Input Lightpath Segment ID column 1708 and Output Lightpath Segment ID column 1714, respectively.

As discussed above, a given lightpath segment may support concurrent data streams that are transmitted using different wavelengths. Accordingly, data in Input Wavelength column 1706 is used to identify the wavelength incoming data is to be transmitted at for a given reservation record, while data in Output Wavelength column 1712 is used to identify the wavelength outgoing data is to be transmitted at.

Routing paths through each switching node are reserved for a respective time slot of variable duration based on appropriate information contained in the reservation request message. Typically, the time slot will be defined by a start time and an end time, with corresponding data stored in Start Time column 1716 and End time column 1718. In one embodiment, the start time comprises an offset from the time at which a control burst is processed by the switching node. Optionally, a start time may be specified by PBS data burst a start time field 2030 (see below).

The end time for a given reservation is stored in End Time 1718. The end time, in effect, will comprise an offset from the start time, wherein the offset is selected such that the full data burst may be successfully transmitted from source to destination without reserving any unnecessary extra time or bandwidth. Typically, a resource reservation request will reserve a resource time slot for an amount of time varying from microseconds to milliseconds, although longer time slots may also be reserved, such as "coarse-grain" time slots lasting from minutes to days. For simplicity, the time data shown Start Time column 1716 and End Time column 1718 only reflect the millisecond level. The length of the reservation request will typically be determined as a function of the data payload (i.e., size of the payload in bytes) and the transmission bandwidth (e.g., 1 gigabits/sec, 10 gigabits/sec, etc.) For example, a payload of 1 megabits would require 1 millisecond to be transferred over a 1 gigabit/s Ethernet (1 GbE) link (assuming no overhead).

The bandwidth % for the request, as well as previously allocated bandwidth %'s, are stored in bandwidth % column

1714. Status bits identifying unconfirmed (0) and confirmed (1) reservations are stored in reservation status column 1716.

In one aspect, resource availability is determined based on the bandwidth availability for the requested lightpath segment, input wavelength, and time period. It is noted that any entry with a time period overlapping the requested time period and having similar parameters to the requested resource is considered, including reservations for both incoming and outgoing traffic. The bandwidth percent of the entries is aggregated, along with the requested bandwidth. If the sum of the bandwidth exceeds a selected threshold value (e.g., 100%) within the same start and end times, there are inadequate resources to satisfy the request.

Figure 14A:
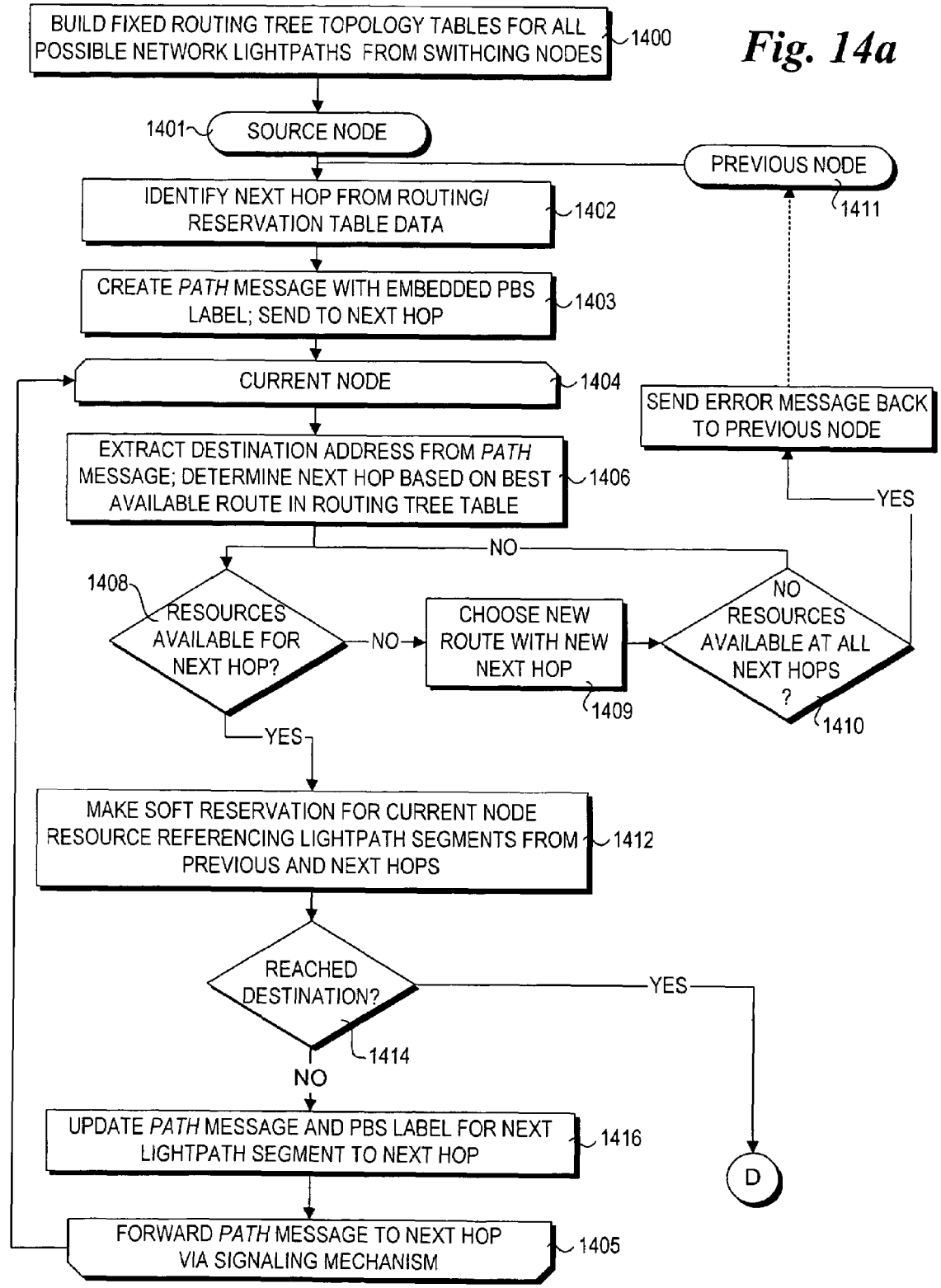
FIGS. 14a and 14b collectively comprises respective portions of a flowchart illustrating logic and operations performed during a lightpath reservation process using overlay routing in which GMPLS-based labels are employed, according to one embodiment of the present invention.

Returning to the flowchart of FIG. 14a, if insufficient resources are available at the next hop, a new route with a new next hop is selected in a block 1409. A determination is then made in a decision block 1401 to whether no resources are available for any of the next hops along possible routes to the destination node. In brief, the operations of blocks 1408, 1409 and 1410 are preformed in a loop until either 1) a next hop with sufficient resources for the requested time slot is available; or 2) there are no next hops with sufficient resources available.

If the answer to decision block 1410 is YES, it is not possible to reserve a lightpath that spans the current next hop node. Recall that a given node can only determine availability of adjacent (next hop) nodes, and cannot see reservations beyond those nodes. Thus, suppose there was in instance in which it was determined by router $R_B$ that none of the routes to destination router $R_D$ in its routing tree table were available for the selected time slot. In this case, an error message, such as a PathErr message, is sent back to the previous node in a block 1411, indicating that insufficient resources are available (i.e., the route is not available). In response The logic backs up the routing process, returning it to the previous node (which is router $R_A$ corresponding to source node A in this example), as indicated by a continuation block 1412. Thus, the operations of blocks 1402 and 1403 are repeated to select a new next hop. In this case, the only next hop that is available is edge node $E_D$.

If there are sufficient resources to satisfy the reservation request for a next hop, the logic proceeds to a block 1412 in which a soft reservation is made for the current lightpath segment. In one embodiment, the soft reservation is stored in reservation table 1700 by setting the status bit for the new record to a "0".

Next, a determination is made in a decision block 1414 to whether the destination node has been reached. If it has, the logic proceeds to the next portion of the flowchart illustrated in FIG. 14b. If it has not, the logic proceeds to a block 1416, wherein the Path message and embedded PSB label to be employed for the next hop are updated for the next lightpath segment. The applicable label will now reference the lightpath segment ID for the next lightpath segment in the lightpath route, including new input fiber port and wavelength values, if applicable. The RSVP_Hop object 808 of the Path message will be updated to reflect that node B is now the PHOP node.

The resource reservation request containing the updated label is then forwarded to the next downstream node via the signaling mechanism in accordance with end loop block 1405. As discussed above, the operations in blocks 1406, 1408, 1409, 1410, 1411, 1412, 1413, 1414, and 1416 are then repeated, as appropriate, in an iterative manner until the destination node is reached, resulting in a YES result for decision block 1415.

Figure 14B:
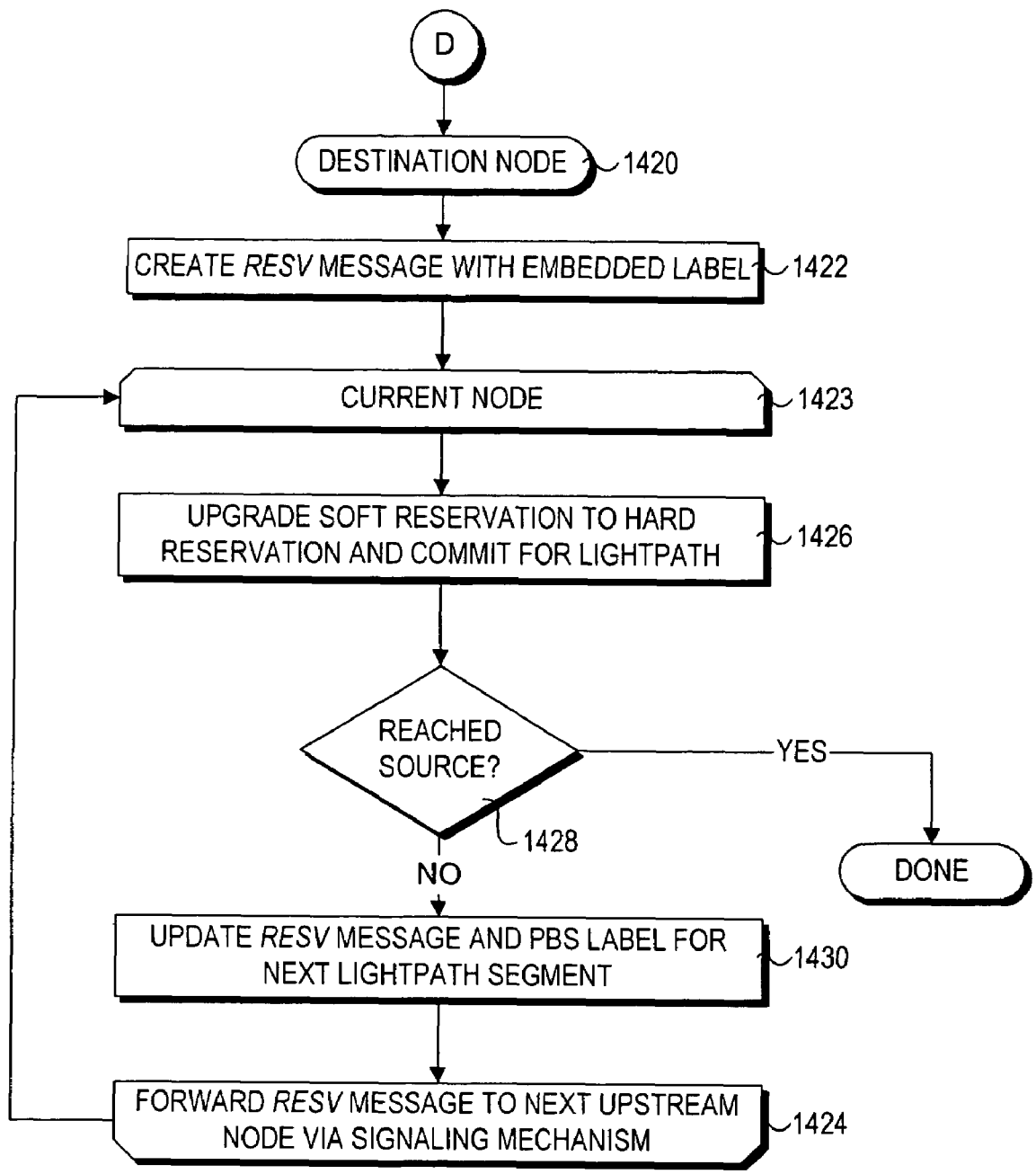

Next, we proceed to the portion of the flowchart shown in FIG. 14b, which represents the upstream portion of the reservation request. At this point the current node is the destination edge node $E_D$, as depicted by a start block 1420. As before, operations are repeated for each of the nodes along the selected lightpath, akin to a back-propagation technique; these operations are delineated by start and end loop blocks 1423 and 1424. The operations are performed at each node, in reverse sequence to the downstream traversal of the lightpath using a Resv message that is created in a block 1422.

Figure 18:
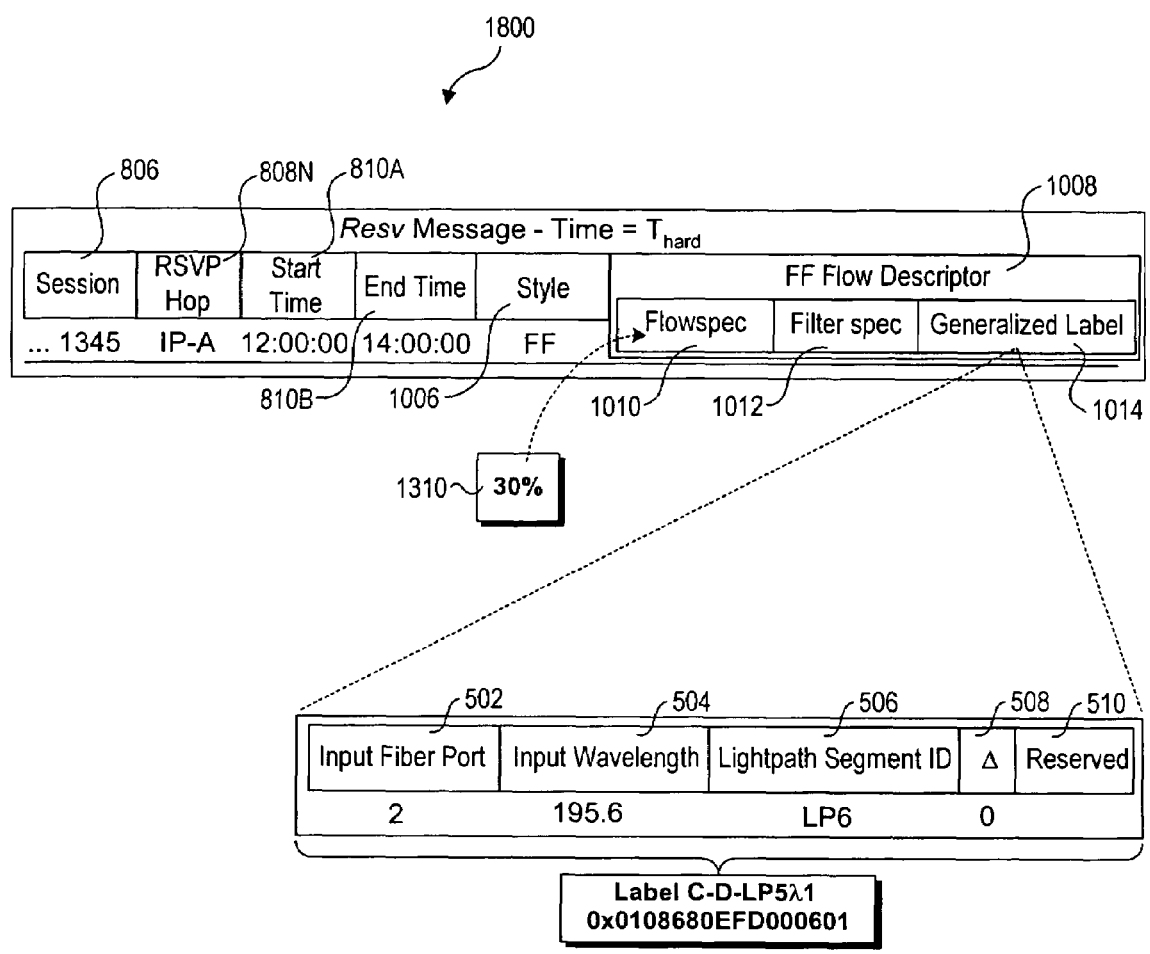
FIG. 18 is a schematic diagram illustrating components of a Resv message employed in an example lightpath reservation process corresponding to FIGS. 14b.

An exemplary Resv message 1800 corresponding to the current state is shown in FIG. 18. Many of the objects contained in Resv message 1800 contain similar values to like-numbered objects contained in Path message 1600, including Session object 806, and start and end time objects 810A and 810B. As discussed above, the Resv message contains a flow descriptor 1008 that includes a PBS_Flowspec 1010, a Filter_Spec 1012, and a Generalized_PBS_Label 1014. In a similar manner to PBS_Sender_TSpec 828 of Path message 1600, PBS_Flowspec 1010 includes a filter field 1310 value of 30%. Also, the Generalized_PBS_Label 1014 will have a form similar to generalized PBS label 500 discussed above. In this instance, the PBS label C-D-0 corresponding to lightpath segment LP6 comprises the first form of the embedded label.

After the initial Resv message is created, the logic proceeds to the looping operation delineated by start and end loop blocks 1423 and 1424. The first operation in the loop occurs in a block 1426, wherein the software reservation for the current node is upgraded to a hard reservation, and the corresponding resources are committed. This is reflected by changing the value in reservation status column 1716 from a "0" (soft, i.e., unconfirmed) to a "1" (hard, i.e., confirmed, meaning the resources are committed).

Following the operation of block 1426, a determination is made to whether the source node has been reached in a decision block 1428. If it has, the process is completed, and all segments on the lightpath are reserved for a subsequent scheduled use. If not, the process proceeds to a block 1430 in which the Resv message and PBS label are updated for the next lightpath segment. The process then repeats itself for the next (now current) switching node until the source node is reached. At this point, all the nodes along the lightpath will have hard (i.e., confirmed) reservations, and the entire lightpath will be scheduled for use during the indicated time slot contained in the reservation table.

As further indicated by the labels depicted in FIG. 6, the labels for a given node pair may change over time to reflect a change in the lightpath routing or network topology. Consider the PBS label values for times $t_0$ and $t_1$. The PBS labels at $t_0$ indicate a lightpath route of LP1 to LP4 to LP6, using wavelengths of 197.2 THz, 196.4 THz, and 195.6 THz, respectively. In contrast, at $t_1$ a portion of the routing path and frequencies have been changed, such that the lightpath route is LP1 to LP4 to LP5, using wavelengths of 197.2 THz, 195.6 THz, and 195.6 THz.

In one embodiment, dynamic routing may be performed using PBS control bursts rather than the GMPLS labels. The use of PBS control burst for dynamic routing reduces the reservation set-up overhead, and thus may improve the overall network bandwidth usage. However, dynamic routes that are generated via PBS control bursts are not applicable for lightpath routes that require wavelength conversion.

Figure 19:
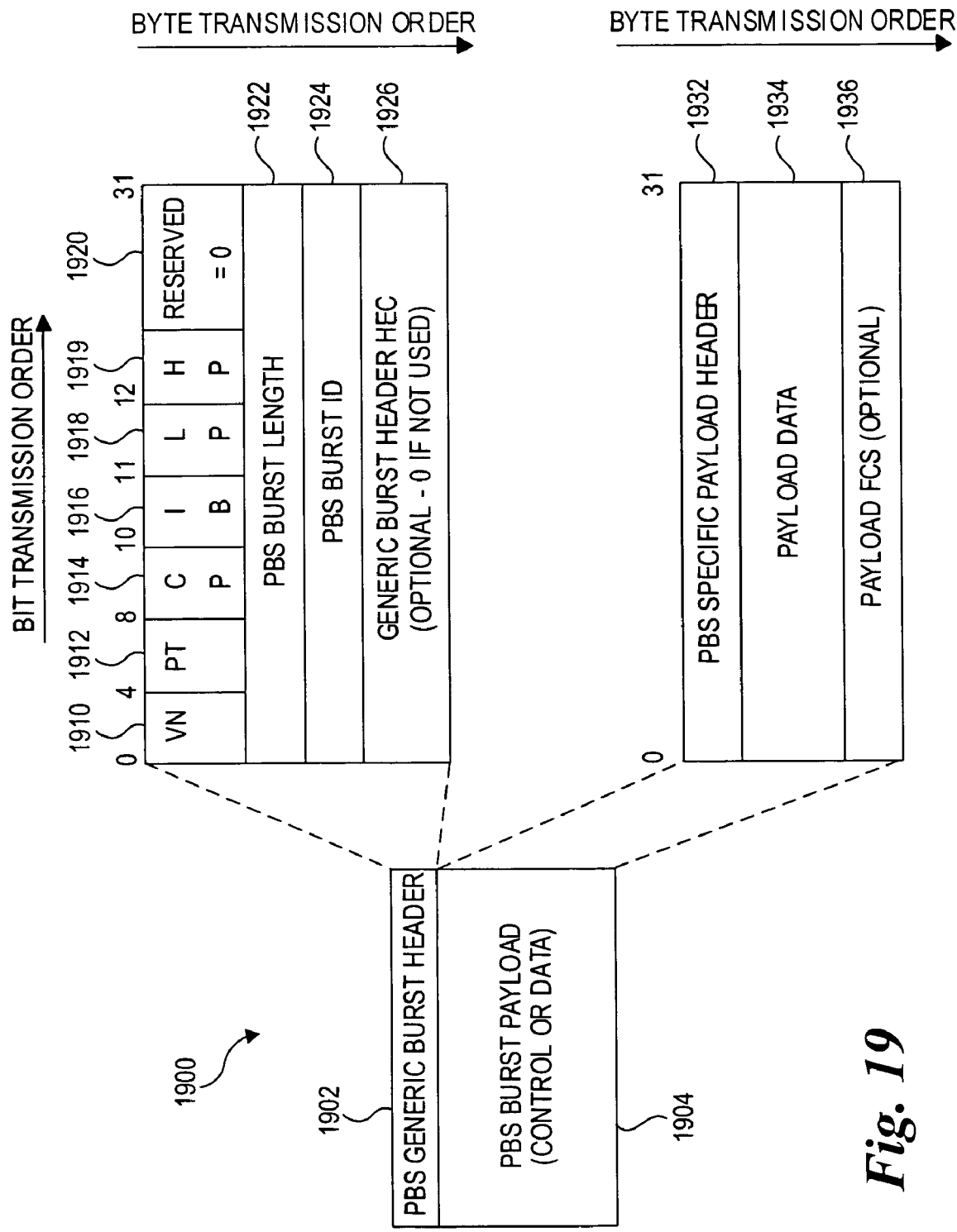
FIG. 19 is a diagram illustrating generic PBS framing format for PBS optical bursts, according to one embodiment of the present invention.

FIG. 19 illustrates a generic PBS framing format 1900 for PBS optical bursts, according to one embodiment of the present invention. Generic PBS frame 1900 includes a PBS generic burst header 1902 and a PBS burst payload 1904 (which can be either a control burst or a data burst). FIG. 19 also includes an expanded view of PBS generic burst header 1902 and PBS burst payload 1904.

PBS generic burst header 1902 is common for all types of PBS bursts and includes a version number (VN) field 1910, a payload type (PT) field 1912, a control priority (CP) field 1914, an in-band signaling (IB) field 1916, a label present (LP) field 1918, a header error correction (HEC) present (HP) field 1919, a burst length field 1922, and a burst ID field 1924. In some embodiments, PBS generic burst header also includes a reserved field 1920 and a HEC field 1926. Specific field sizes and definitions are described below for framing format having 32-bit words; however, in other embodiments, the sizes, order and definitions can be different.

In this embodiment, PBS generic burst header 1902 is a 4-word header. The first header word includes VN field 1910, PT field 1912, CP field 1914, IB field 1916 and LP field 1918. VN field 1910 in this exemplary embodiment is a 4-bit field (e.g., bits 0-3) defining the version number of the PBS Framing format being used to frame the PBS burst. In this embodiment, VN field 1910 is defined as the first 4-bits of the first word, but in other embodiments, it need not be the first 4-bits, in the first word, or limited to 4-bits.

PT field 1912 is a 4-bit field (bits 4-7) that defines the payload type. For example, binary "0000" may indicate that the PBS burst is a data burst, while binary "0001" indicates that the PBS burst is a control burst, and binary "0010" indicates that the PBS burst is a management burst. In this embodiment, PT field 1912 is defined as the second 4-bits of the first word, but in other embodiments, it need not be the second 4-bits, in the first word, or limited to 4-bits.

CP field 1914 is a 2-bit field (bits 8-9) that defines the burst's priority. For example, binary "00" may indicate a normal priority while binary "01" indicates a high priority. In this embodiment, PT field 1912 is defined bits 8 and 9 of the first word, but in other embodiments, it need not be bits 8 and 9, in the first word, or limited to 2-bits.

IB field 1916 is a one-bit field (bit 10) that indicates whether the PBS control burst is being signaled in-band or OOB. For example, binary "0" may indicate OOB signaling while binary "1" indicates in-band signaling. In this embodiment, IB field 1916 is defined as bit 10 of the first word, but in other embodiments, it need not be bit 10, in the first word, or limited to one-bit.

LP field 1918 is a one-bit field (bit 11) used to indicate whether a label has been established for the lightpath carrying this header. In this embodiment, LP field 1918 is defined as bit 11 of the first word, but in other embodiments, it need not be bit 11, in the first word, or limited to one-bit.

HP field 1919 is a one-bit (bit 12) used to indicate whether header error correction is being used in this control burst. In this embodiment, HP field 1919 is defined as bit 12 of the first word, but in other embodiments, it need not be bit 12, in the first word, or limited to one-bit. The unused bits (bits 13-31) form field(s) 1920 that are currently unused and reserved for future use.

The second word in PBS generic burst header 1902, in this embodiment, contains PBS burst length field 1922, which is used to store a binary value equal to the length the number of bytes in PBS burst payload 1904. In this embodiment, the PBS burst length field is 32-bits. In other embodiments, PBS burst length field 1922 need not be in the second word and is not limited to 32-bits.

In this embodiment, the third word in PBS generic burst header 1902 contains PBS burst I) field 1924, which is used to store an identification number for this burst. In this embodiment, PBS burst ID field 1924 is 32-bits generated by the ingress node (e.g., ingress node 710 in FIG. 7). In other embodiments, PBS burst ID field 1924 need not be in the third word and is not limited to 32-bits.

The fourth word in PBS generic burst header 1902, in this embodiment, contains generic burst header HEC field 1926, which is used to store an error correction word. In this embodiment, generic burst header HEC field 1926 is 32-bits generated using any suitable known error correction technique. In other embodiments, generic burst header HEC field 1926 need not be in the fourth word and is not limited to 32-bits. As in indicated in FIG. 19, generic burst header HEC field 1926 is optional in that if error correction is not used, the field may be filled with all zeros. In other embodiments, generic burst header HEC field 1926 is not included in PBS generic burst header 1902.

PBS burst payload 1904 is common for all types of PBS bursts and includes a PBS specific payload header field 1932, a payload field 1934, and a payload frame check sequence (FCS) field 1936.

In this exemplary embodiment, PBS specific payload header 1932 is the first part (i.e., one or more words) of PBS burst payload 1904. Specific payload header field 1932 for a control burst is described below in more detail in conjunction with FIG. 20. Similarly, specific payload field 1932 for a data burst is described below in conjunction with FIG. 20. Typically, specific payload header field 1932 includes one or more fields for information related to a data burst, which can be either this burst itself or contained in another burst associated with this burst (i.e., when this burst is a control burst).

Payload data field 1934, in this embodiment, is the next portion of PBS burst payload 1904. In some embodiments, control bursts have no payload data, so this field may be omitted or contain all zeros. For data bursts, payload data field 1934 may be relatively large (e.g., containing multiple IP packets or Ethernet frames).

Payload FCS field 1936, in this embodiment, is the next portion of PBS burst payload. In this embodiment, payload FCS field 1936 is a one-word field (i.e., 32-bits) used in error detection and/or correction. As in indicated in FIG. 19, payload FCS field 1936 is optional in that if error detection/correction is not used, the field may be filled with all zeros. In other embodiments, payload FCS field 1936 is not included in PBS burst payload 1904.

Figure 20:
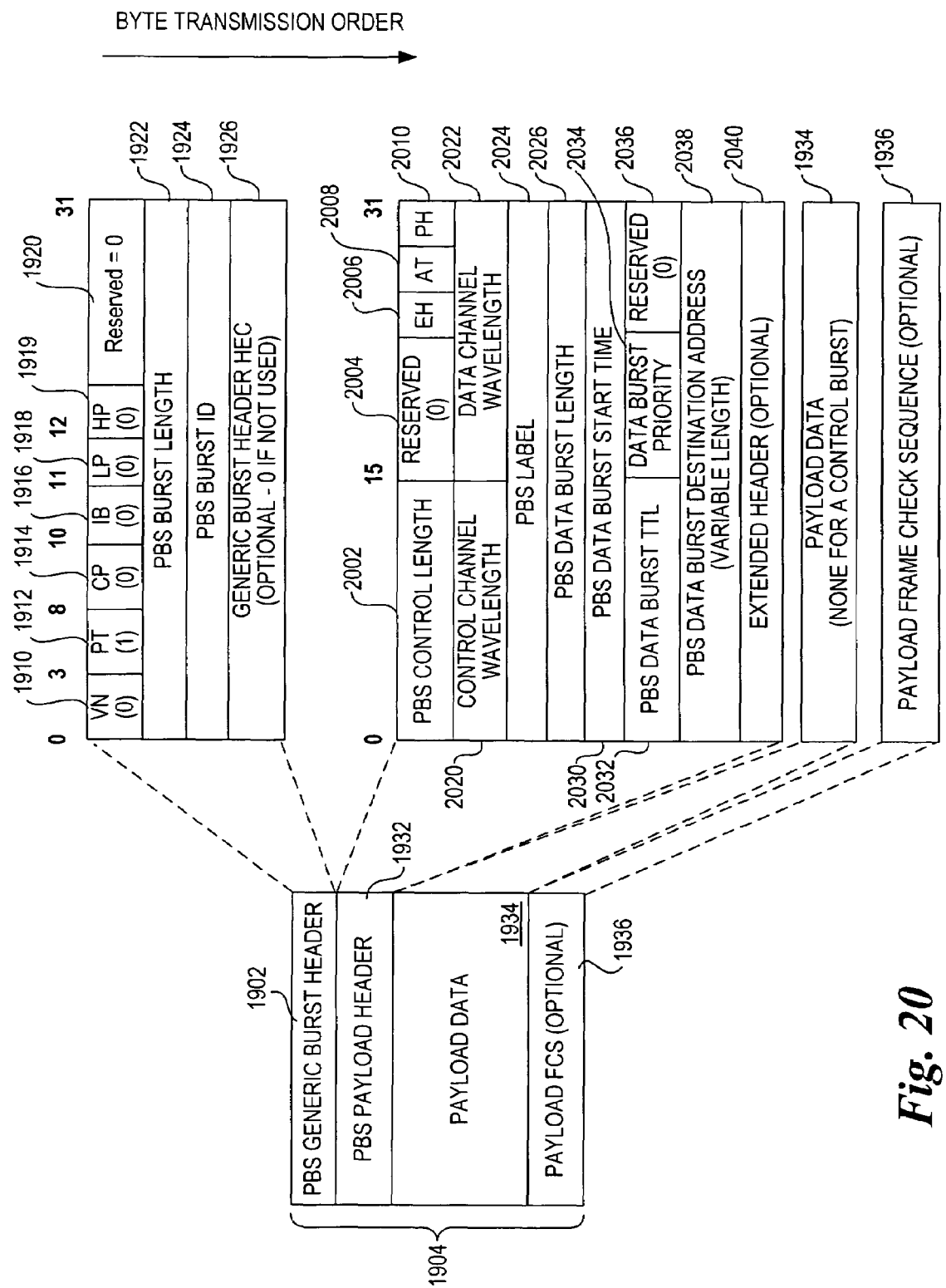
FIG. 20 is a diagram illustrating further details of the PBS framing format of FIG. 19, according to one embodiment of the present invention.

FIG. 20 illustrates a PBS optical control burst framing format 2000, according to one embodiment of the present invention. To help improve clarity, FIG. 20 includes the expanded views of PBS generic burst header 1902 and PBS burst payload 1904 (previously described in conjunction with FIG. 19), with a further expansion of PBS payload header field 1932 (described below) when part of a control burst. In this example, the PT field is set to "01" to indicate that the burst is a control burst. The CP field is set to "0" to indicate that the burst has normal priority. The IB field is set to "0" to indicate that the burst is using OOB signaling. The LP field is set to "0" to indicate that there is no label for this control burst.

In this exemplary embodiment of a PBS control burst, PBS payload header field 1932 includes: a PBS control length field 2002; an extended header (EH) field 2006; an address type (AT) field 2008; a payload FCS present (PH) field 2010; a control channel wavelength field 2020; a data channel wavelength field 2022; a PBS label field 2024; a PBS data burst length field 2026; a PBS data burst start time field 2030; a PBS data burst time-to-live (TTL) field 2032;

a data burst priority field 2034; a PBS data burst destination address field 2038; and an optional extended header field 2040.

In this embodiment, the first word of PBS payload header 1932 includes PBS control length field 2002, which is used for storing the length of the control header in bytes. PBS control length field 2002 is a 16-bit field (bits 0-15) calculated by a control burst builder or control burst processor. In other embodiments, PBS control length field 2002 need not be the first 16-bits, in the first word, or limited to 16-bits. A reserved field 2004 (bits 16-27) is included in PBS payload header 1932 in this embodiment. In other embodiments, these bits may be used for other field(s).

The first word of PBS payload header 1932 also includes EH field 2006, which is used in this embodiment to indicate whether an extended header is present in the burst. In this embodiment, EH field 2006 is a 1-bit field (bit 28). In other embodiments, EH field 2006 need not be bit 28, or in the first word.

The first word of PBS payload header 1932 also includes AT field 2008, which is used in this embodiment to indicate the address type of the associated PBS data burst's destination. For example, the address type may be an IP address (e.g., IPv4, IPv6), a network service access point (NSAP) address, an Ethernet address or other type of address. In this embodiment, AT field 2008 is a 2-bit field (bits 29-30). In other embodiments, AT field 2008 need not be bits 17-18, in the first word, or limited to 2-bits.

In this embodiment, the first word of PBS payload header 1932 also includes PH field 2010, which is used to indicate whether a payload FCS is present in the burst. In this embodiment, PH field 2010 is a 1-bit field (bit 31). In other embodiments, EH field 2006 need not be bit 16, or in the first word.

The second word of PBS payload header 1932, in this embodiment, includes control channel wavelength field 2020, which is used to indicate a WDM wavelength in which the control burst is supposed to be modulated. In this embodiment, control channel wavelength field 2020 is a 16-bit field (bits 0-15). In other embodiments, control channel wavelength field 2020 need not be bits 0-15, in the second word, or limited to 16-bits.

In this embodiment, the second word of PBS payload header 1932 also includes data channel wavelength field 2022, which is used to indicate a WDM wavelength in which the data burst is to be modulated. In this embodiment, data channel wavelength field 2022 is a 16-bit field (bits 16-31). In other embodiments, data channel wavelength field 2022 need not be bits 16-31, in the second word, or limited to 16-bits.

A third word of PBS payload header 1932 includes PBS label field 2024, which is used in this embodiment to store the label (if any) for the lightpath being used by the burst. In this embodiment, the label is a 32-bit word generated by label management component 67 (FIG. 6). In other embodiments, PBS label field 2024 need not be the third word, or limited to 32-bits.

A fourth word of PBS payload header 1932 includes PBS data burst length field 2026. In this embodiment, the PBS data burst length is a 32-bit word. In other embodiments, PBS data burst length field 2026 need not be the fourth word, or limited to 32-bits.

A fifth word of PBS payload header 1932 includes PBS data burst start time field 2030. In this embodiment, the PBS data burst start time is a 32-bit word, generated by a burst scheduler. In other embodiments, PBS data burst start time field 2030 need not be the fifth word, or limited to 32-bits.

A sixth word of PBS payload header 1932 includes PBS data TTL field 2032. In this embodiment, PBS data TTL field 2032 is a 16-bit (bits 0-15) field, generated by an ingress PBS MAC component. For example, in one embodiment, the burst scheduler of an ingress PBS MAC component can generate the TTL value. In other embodiments, PBS data TTL field 2032 need not be bits 0-15, in the sixth word, or limited to 16-bits.

The sixth word of PBS payload header 1932 also includes data burst priority field 2032. In this embodiment, data burst priority field 2032 is an 8-bit field (bits 16-23), generated by the ingress PBS MAC component. For example, in one embodiment, the burst scheduler of the ingress PBS MAC component can generate the data burst priority value. In other embodiments, data burst priority field 2032 need not be bits 16-23, in the sixth word, or limited to 8-bits. Further, in this embodiment, the sixth word of PBS payload header 1932 includes a reserved field 2036 (bits 24-31) which can be used in the future for other field(s).

A seventh word of PBS payload header 1932 also includes PBS data burst destination address field 2038. In this embodiment, PBS data burst destination address field 2038 is variable length field, shown as a single 32-bit word for clarity. In other embodiments, PBS data burst destination address field 2038 need not be limited to 32-bits. The actual length of the address may vary, depending on the address type as indicated in AT field 2008.

An eight word of PBS payload header 1932 can include extended header field 2040. This header can be used to hold other header data that may be used in the future. When this header is used, EH field 2006 is set to 1. In this embodiment, payload data field 1934 and payload FCS field 1936 have been described above.

Figure 14C:
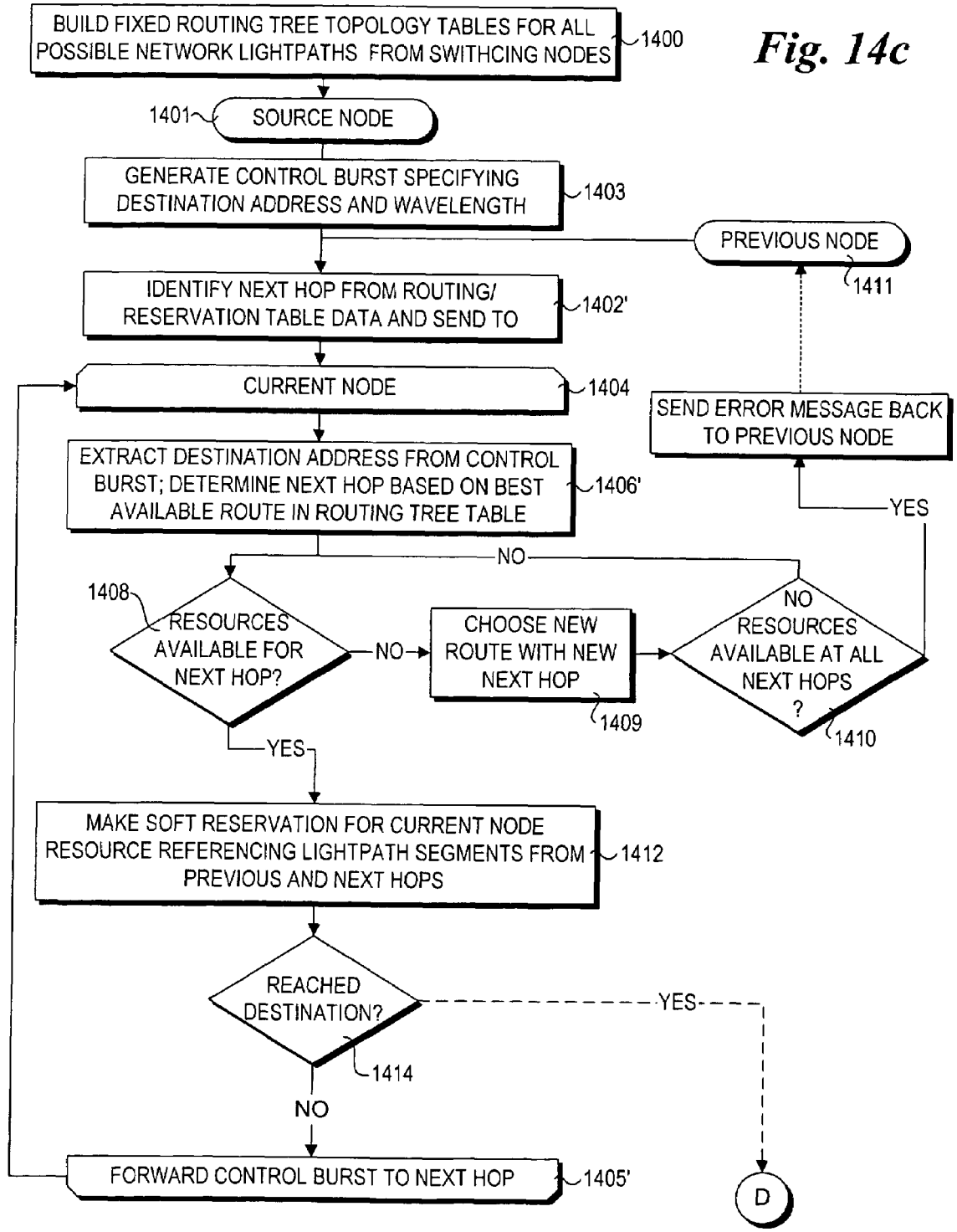
FIG. 14c is a flowchart illustrating logic and operations performed during a lightpath reservation process using overlay routing in which a PBS control burst is employed, according to one embodiment of the present invention.

Details of a dynamic routing process in which the lightpath reservation request is forwarded via a control burst according to one embodiment are shown in FIG. 14c. Many operations (i.e., the blocks having the same reference numbers) are the same as those discussed above with reference to the label-based dynamic routing scheme of FIG. 14a. Accordingly, the following discussion will only consider the differences between the two schemes. These differences occur in blocks 1403, 1402', 1405', 1406' and 1412'. It is further noted that the dynamic routing scheme of FIG. 14c does not include the label-related operations of blocks 1403, 1405, 1406, and 1416 in FIG. 14a.

In block 1403, the source node generates a control burst specifying a destination address in field 2038 and a data channel wavelength in field 2022. The data channel wavelength pertains to the wavelength for the entire lightpath that is to be reserved. The values in PBS data bust start time field 2030 and the PBS data burst length field 2026 are used to schedule the start time and duration of the reservation.

In block 1402', the next hop is identified from the routing/reservation table data for the source node in a manner similar to block 1402, and the control burst is sent to the next hop that is identified. In block 1406', the destination address is extracted from the control burst. The next hop is then determined for the current node based on the vest available route in its routing tree table in a manner similar to block 1406. In end loop block 1405', the control burst is forwarded to the next hop.

In one embodiment, soft reservations are made in block 1412' in a manner similar to that described for block 1412. In another embodiment, the concept of soft and hard reservations is not employed, wherein reservations are confirmed during the first and only pass of the reservation process. Accordingly, the process is completed when the destination node is reached, and does not proceed to the reservation confirmation process of FIG. 14b.

Figure 21:
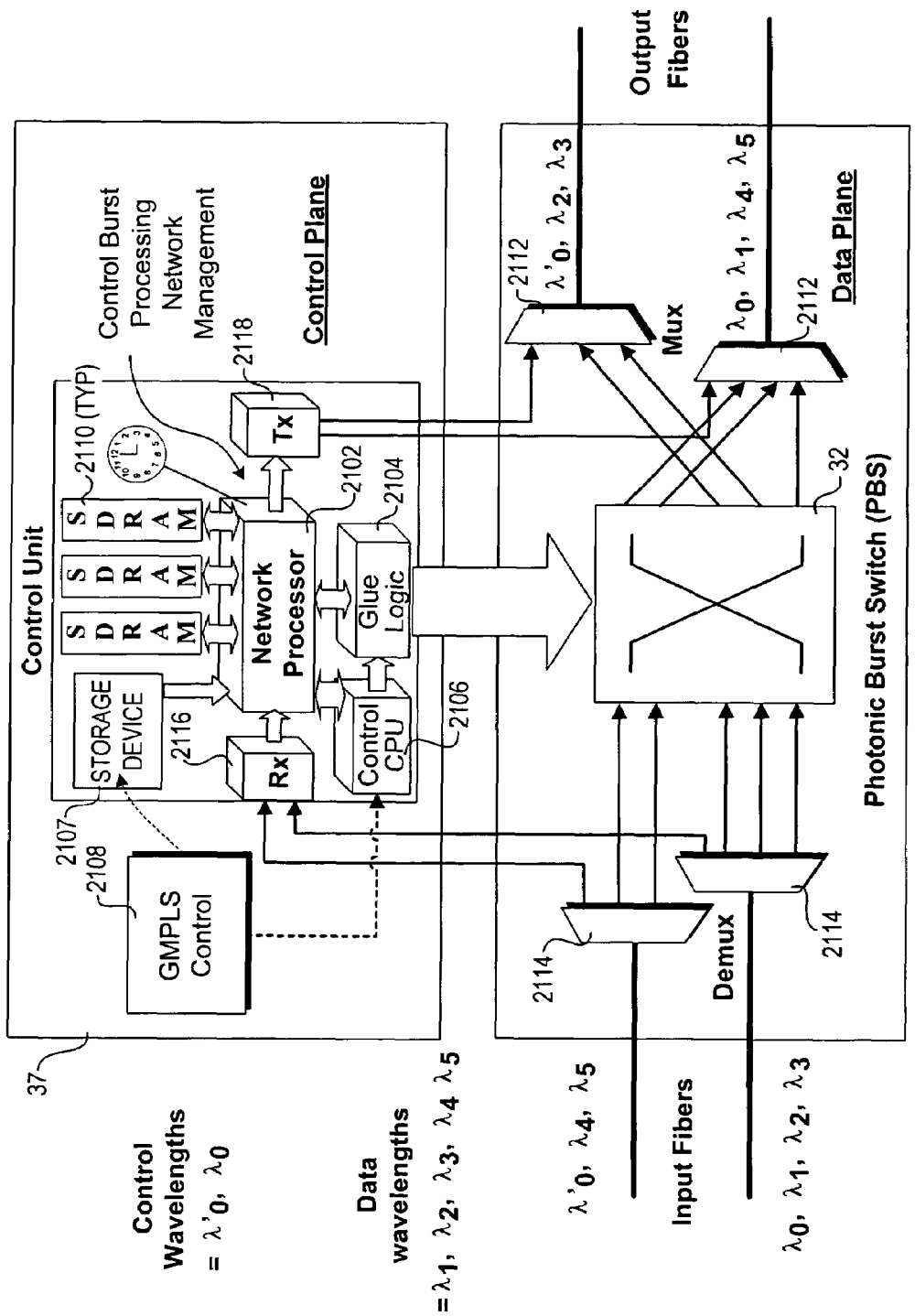
FIG. 21 is a schematic diagram of a PBS switching node architecture, according to one embodiment of the invention.

A simplified block diagram 2100 of a PBS switching node architecture in accordance with one embodiment is shown in FIG. 21. The intelligent switching node architecture is logically divided into control plane components and data plane. The control plane includes a control unit 37 employing a network processor (NP) 2102, coupled to glue logic 2104 and a control processor (CPU) 2106 that runs software components stored in a storage device 2107 to perform the resource reservations operations 2108 disclosed herein. Network processor 2102 is also coupled to one or more banks of SDRAM (synchronous dynamic random access memory) memory 2110, which is used for general memory operations. The data plane architecture comprises a non-blocking PBS fabric 32, coupled to optical multiplexers 2112, de-multiplexers 2114, and optical transceivers (as depicted by an optical receiver (Rx) block 2116 and an optical transmitter (Tx) block 2118).

The burst assembly and framing, burst scheduling and control, which are part of the PBS MAC layer and related tasks are performed by network processor 2102. Network processors are very powerful processors with flexible micro-architecture that are suitable to support wide-range of packet processing tasks, including classification, metering, policing, congestion avoidance, and traffic scheduling. For example, the Intel® IXP2800 NP, which is used in one embodiment, has 16 microengines that can support the execution of up to 1493 microengine instructions per packet at a packet rate of 15 million packets per second for 10 GbE and a clock rate of 1.4 GHz.

In one embodiment, the optical switch fabric has strictly non-blocking space-division architecture with fast (<100 ns) switching times and with limited number of input/output ports (e.g., ≈8×8, 12×12). Each of the incoming or outgoing fiber links typically carries only one data burst wavelength. The switch fabric, which generally has no or limited optical buffering fabric, performs statistical burst switching within a variable-duration time slot between the input and output ports. If needed, the optical buffering can be implemented using fiber-delay-lines (FDLs) on several unused ports, such as taught in L. Xu, H. G. Perros, and G. Rouskas, "Techniques for Optical Packet Switching and Optical Burst Switching," *IEEE Communication Magazine* 1, 136-142 (2001). The PBS network can operate with a relatively small number of control wavelengths ($\lambda'_0$, $\lambda_0$), since they can be shared among many data wavelengths. Furthermore, the PBS switch fabric can also operate with a single wavelength using multiple fibers; however, further details of this implementation are not disclosed herein. In implementations in which lightpaths comprising lightpath segments at different wavelength are to be supported, the switching fabric further includes wavelength converters. The wavelength converters are used to change the wavelength of an incoming signal to a different wavelength corresponding to an outgoing signal.

The control bursts can be sent either in-band (IB) or out of band (OOB) on separate optical channels. For the OOB case, the optical data bursts are statistically switched at a given wavelength between the input and output ports within a variable time duration by the PBS fabric based on the reserved switch configuration as set dynamically by network processor 2102. NP 2102 is responsible to extract the routing information from the incoming control bursts, providing fix-duration reservation of the PBS switch resources for the requested data bursts, and forming the new outgoing control bursts for the next PBS switching node on the path to the egress node. In addition, the network processor provides overall PBS network management functionality based on then extended GMPLS-based framework discussed above. For the IB case, both the control and data bursts are transmitted to the PBS switch fabric and control interface unit. However, NP 2102 ignores the incoming data bursts based on the burst payload header information. Similarly, the transmitted control bursts are ignored at the PBS fabric since the switch configuration has not been reserved for them. One advantage of this approach is that it is simpler and cost less to implement since it reduces the number of required wavelengths.

Another approach for IB signaling is to use different modulation formats for the control bursts and the data bursts. For example, the control bursts are non-return to zero (NRZ) modulated while the data bursts are return to zero (RZ) modulated. Thus, only the NRZ control bursts are demodulated at the receiver in the PBS control interface unit while the RZ data bursts are ignored. The specific OOB or IB control-signaling scheme to be selected is application dependent.

Embodiments of method and apparatus for implementing a resource reservation schedules in a photonic burst switching network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A method comprising:
dynamically discovering an available lightpath route comprising a concatenation of a plurality of lightpath segments connected via respective nodes along a route spanning from a source edge node to a destination edge node and including at least one switching node in an optical switched network;
reserving network resources to enable transmission of data between the source and destination nodes along the lightpath route during a scheduled time slot, wherein reservation of the network resources causes said at least one switching node and the source and destination edge nodes to be configured so as to form a virtual optical-switched circuit between the source and destination edge nodes during the scheduled time slot;
making soft reservations for the network resources at the nodes along the route during a first traversal of the route; and
changing the soft reservations to hard reservations to commit the network resources at the nodes along the route during a second traversal of the route.

2. The method of claim 1, wherein the optical switched network comprises a photonic burst switched (PBS) network.

3. The method of claim 2, wherein the optical burst switched network comprises a wavelength-division multiplexed (WDM) PBS network.

4. The method of claim 1, wherein the lightpath route is dynamically discovered by performing operations including:
(a) generating a routing tree table at each of a plurality of switching nodes in the optical switched network;
(b) storing resource reservation data at each of the switching nodes;
(c) sending a lightpath reservation request identifying a time slot to be scheduled from the source edge node to a first next hop node comprising a first hop along the lightpath route;
(d) determining if the first next hop node has sufficient resources to support transmission of data via an optical-switched lightpath signal that is to be switched through the node during the time slot;
(e) determining a second next hop comprising one of a switching node or the destination edge node based on routes in the routing tree table in combination with the resource reservation data maintained at the first next hop node;
(f) forwarding the lightpath reservation request to the second next hop node; and
(g) repeating operations (d)-(f) until the lightpath reservation request has been forwarded to an nth next hop node comprising the destination node.

5. The method of claim 4, wherein making the soft reservations for the network resources at the nodes along the route during the first traversal of the route includes:
making a first soft reservation for a node resource if sufficient resources to support the lightpath reservation are determined to be available for the time slot.

6. The method of claim 5, wherein the soft reservations are made during an upstream traversal of the lightpath route, and the method further comprises:
passing a resource reservation response message between the nodes in a downstream traversal of the lightpath route, the resource reservation response message including resource reservation response information;
extracting, at each node, the resource reservation response information from the resource reservation response message; and
changing, at each node, the soft reservation for the node resource to a hard reservation.

7. The method of claim 6, wherein the resource reservation response message comprises a Resv message having a format based on an extension to the RSVP-TE (ReSerVation Protocol-Traffic Engineering) signaling protocol.

8. The method of claim 4, wherein the lightpath reservation request includes a generalized multi-protocol label-switching (GMPLS)-based label defining transmission parameters for a lightpath segment to which the GMPLS-based label corresponds.

9. The method of claim 8, wherein the GMPLS-based label includes at least one field identifying an input wavelength employed for carrying signals over a lightpath segment identified by the GMPLS-based label.

10. The method of claim 4, wherein the lightpath reservation request comprises a Path message having a format based on an extension to the RSVP-TE (ReSerVation Protocol-Traffic Engineering) signaling protocol.

11. The method of claim 4, wherein the optical switched network comprises a photonic burst switched (PBS) network and wherein the lightpath reservation request is forwarded via a PBS control burst.

12. The method of claim 4, further comprising:
returning the lightpath reservation request along with a reservation error message to a previous node if it is determined at a current next hop node that the node does not have sufficient resources to support the lightpath reservation during the time slot;
determining a new next hop from the previous node based on routes in the routing tree table in combination with the resource reservation data maintained at the previous node; and
repeating operations (d)-(f) beginning at the new next hop until the lightpath reservation request has been forwarded to the destination node.

13. The method of claim 1, wherein a partial use of a node resource may be reserved.

14. The method of claim 13, wherein the partial use comprises a bandwidth percentage use of a lightpath segment.

15. A switching node apparatus for use in an optical switched network, comprising:
optical switch fabric, having at least one input fiber port and at least one output fiber port; and
a control unit, operatively coupled to control the optical switch fabric, including at least one processor and a first storage device operatively coupled to said at least one processor containing machine-executable instructions, which when executed by said at least one processor perform operations, including:
generating a routing tree table identifying applicable routes to route data between the switching node apparatus when implemented as a first node in an optical switched network and other nodes in the optical switched network;
maintaining a resource reservation table including reservations of switching node apparatus resources for scheduled time slots;
receiving a lightpath resource reservation request from a second node, said resource reservation request including data identifying an address of a destination node and a scheduled time slot for which resources for the switching node apparatus are requested to be reserved for a lightpath traversing a plurality of nodes from a source node to the destination node;

dynamically determining a third node comprising a next hop node for the lightpath based on routing information contained in the routing tree table and resource availability determined from the resource reservation table; and forwarding the lightpath resource reservation request to the next hop node; and reserving network resources corresponding to the lightpath resource reservation request to support routing of data through the switching node apparatus for the scheduled time slot.

16. The switching node apparatus of claim 15, wherein the network resource is reserved by performing operations including:

making a soft reservation of network resources supporting data transmission via the lightpath for the scheduled time slot;

receiving a reservation response; and changing the soft reservation to a hard reservation to commit the network resources for the scheduled time slot.

17. The switching node apparatus of claim 16, wherein the resource reservation response message comprises a Resv message having a format based on an extension to the RSVP-TE (ReSerVation Protocol-Traffic Engineering) signaling protocol.

18. The switching node apparatus of claim 17, wherein execution of the instructions further performs the operation of storing resource reservation data on one of the first storage device or a second storage device operatively coupled to said at least one processor.

19. The switching node apparatus of claim 17, wherein the optical switched network comprises a photonic burst switched (PBS) network.

20. The switching node apparatus of claim 17, wherein the optical switched network comprises a wavelength-division multiplexed (WDM) PBS network; and the optical switching fabric provides switching of optical signals comprising different wavelengths carried over common fibers that may be respectively coupled to said at least one input fiber port and said at least one output fiber port.

21. The switching node apparatus of claim 17, wherein the lightpath resource reservation request message includes a generalized multi-protocol label-switching (GMPLS)-based label defining transmission parameters for the resource reservation.

22. The switching node apparatus of claim 21, wherein the lightpath resource reservation request message comprises a Path message having a format based on an extension to the RSVP-TE (ReSerVation Protocol-Traffic Engineering) signaling protocol.

23. The switching node apparatus of claim 22, wherein execution of the instructions further performs the operations of:

updating the Path message to include a GMPLS-based label corresponding to a resource reservation to be made for the next hop node.

24. The switching node apparatus of claim 15, wherein execution of the instructions further performs the operations of:

determining that insufficient resources are available at the next hop nodes of all applicable routes to the destination node; and returning the lightpath resource reservation request to the first node along with error indicia informing the first node to select a new route to the destination node that does not pass through the switching node apparatus.

25. The switching node apparatus of claim 15, wherein said at least one processor includes a network processor.

26. The switching node apparatus of claim 15, wherein said at least one processor further includes a control processor.

27. A machine-readable medium to provide instructions, which when executed by a processor in a switching node apparatus comprising a first node in an optical switched network, cause the switching node apparatus to perform operations comprising:

generating a routing tree table identifying applicable routes to route data between the switching node apparatus when implemented as a first node in an optical switched network and other nodes in the optical switched network;

maintaining a resource reservation table including reservations of switching node apparatus resources for scheduled time slots;

receiving a lightpath resource reservation request from a second node, said resource reservation request including data identifying an address of a destination node and a scheduled time slot for which resources for the switching node apparatus are requested to be reserved for a lightpath traversing a plurality of nodes from a source node to the destination node;

dynamically determining a third node comprising a next hop node for the lightpath based on routing information contained in the routing tree table and resource availability determined from the resource reservation table; and forwarding the lightpath resource reservation request to the next hop node; and reserving network resources corresponding to the lightpath resource reservation request to support routing of data through the switching node apparatus for the scheduled time slot.

28. The machine-readable medium of claim 27, wherein the network resource is reserved by performing operations including:

making a soft reservation of network resources supporting data transmission via the lightpath for the scheduled time slot;

receiving a reservation response; and changing the soft reservation to a hard reservation to commit the network resources for the scheduled time slot.

29. The machine-readable medium of claim 27, wherein execution of the instructions determines the next hop node by performing operations including:

(a) selecting a route from the switching apparatus to the destination node;

(b) determining if sufficient network resources are available to transmit data between the switching node apparatus and a first hop node in the route that is selected during the scheduled time slot;

(c) selecting the first hop node as the next hop node if sufficient network resources are available; otherwise (d) selecting a new route from the switching apparatus to the destination node; and repeating operations (b)-(d) until it is determined that a first hop node has sufficient network resources available.

* * * * *